(12) United States Patent
Feitisch et al.

(10) Patent No.: US 11,953,427 B2
(45) Date of Patent: Apr. 9, 2024

(54) RECONSTRUCTION OF FREQUENCY REGISTRATION FOR QUANTITATIVE SPECTROSCOPY

(71) Applicant: SpectraSensors, Inc., Rancho Cucamonga, CA (US)

(72) Inventors: Alfred Feitisch, Los Gatos, CA (US); Xiang Liu, Rancho Cucamonga, CA (US); Kevin Ludlum, Los Gatos, CA (US); Mathias Schrempel, Alta Loma, CA (US)

(73) Assignee: Endress+Hauser Optical Analysis, Inc., Ann Arbor, MI (US)

( * ) Notice: Subject to any disclaimer, the term of this patent is extended or adjusted under 35 U.S.C. 154(b) by 729 days.

(21) Appl. No.: 15/227,876

(22) Filed: Aug. 3, 2016

(65) Prior Publication Data

US 2017/0059477 A1 Mar. 2, 2017

Related U.S. Application Data

(60) Provisional application No. 62/200,581, filed on Aug. 3, 2015.

(51) Int. Cl.
*G01N 21/27* (2006.01)
*G01J 3/02* (2006.01)
(Continued)

(52) U.S. Cl.
CPC .......... *G01N 21/274* (2013.01); *G01J 3/0297* (2013.01); *G01J 3/28* (2013.01);
(Continued)

(58) Field of Classification Search
None
See application file for complete search history.

(56) References Cited

U.S. PATENT DOCUMENTS 5,243,546 A * 9/1993 Maggard .............. G01N 21/274
702/90
5,303,165 A * 4/1994 Ganz ......................... G01J 3/28
356/319

(Continued)

FOREIGN PATENT DOCUMENTS

CN 103698008 A 4/2014
DE 19743493 C2 2/2001

(Continued)

OTHER PUBLICATIONS

Ozdemir, D. et al. "Effect Of Wavelength Drift On Single- And Multi-Instrument Calibration Using Genetic Regression." *Applied Spectroscopy*,The Society For Applied Spectroscopy. Baltimore, US, vol. 52, No. 9, Sep. 1, 1998 (Sep. 1, 1998), pp. 1203-1209. XP000779129, ISSN: 0003-7028, DOI: 10.1366/0003702981945020 abstract p. 1204.

(Continued)

*Primary Examiner* — Arleen M Vazquez
*Assistant Examiner* — Leonard S Liang
(74) *Attorney, Agent, or Firm* — Christopher R. Powers; Endress+Hauser (USA) Holding, Inc.

(57) ABSTRACT

Frequency registration deviations occurring during a scan of a frequency or wavelength range by a spectroscopic analysis system can be corrected using passive and/or active approaches. A passive approach can include determining and applying mathematical conversions to a recorded field spectrum. An active approach can include modifying one or more operating parameters of the spectroscopic analysis system to reduce frequency registration deviation.

20 Claims, 9 Drawing Sheets

(51) Int. Cl.
  *G01J 3/28*      (2006.01)
  *G01J 3/42*      (2006.01)
  *G01J 3/457*     (2006.01)
  *G01N 21/39*     (2006.01)
  *G01N 21/21*     (2006.01)
  *G01N 21/35*     (2014.01)
  *G01N 21/3504*   (2014.01)
  *G01N 21/359*    (2014.01)

(52) U.S. Cl.
  CPC .......... *G01J 3/42* (2013.01); *G01J 3/457* (2013.01); *G01N 21/39* (2013.01); *G01J 2003/423* (2013.01); *G01N 21/211* (2013.01); *G01N 21/35* (2013.01); *G01N 21/3504* (2013.01); *G01N 21/359* (2013.01); *G01N 2021/3595* (2013.01); *G01N 2021/399* (2013.01)

(56) References Cited

U.S. PATENT DOCUMENTS

| | | | | |
|---|---|---|---|---|
| 5,440,388 A * | 8/1995 | Erickson | | A61B 5/7257 356/456 |
| 5,528,040 A * | 6/1996 | Lehmann | | G01J 3/42 250/343 |
| 6,029,115 A * | 2/2000 | Tracy | | G01J 3/28 356/319 |
| 6,178,002 B1 * | 1/2001 | Mueller-Wirts | | G01J 9/02 356/491 |
| 6,549,861 B1 * | 4/2003 | Mark | | G01J 3/28 356/931 |
| 6,674,526 B1 * | 1/2004 | Marbach | | G01J 3/2803 356/326 |
| 6,711,516 B2 * | 3/2004 | Samsoondar | | G01N 21/274 356/42 |
| 7,009,170 B2 * | 3/2006 | Dobbs | | G01N 21/3151 250/214 A |
| 7,450,340 B2 | 11/2008 | Lee et al. | | |
| 7,586,094 B2 | 9/2009 | Liu et al. | | |
| 7,704,301 B2 * | 4/2010 | Zhou | | G01N 21/3504 73/23.23 |
| 8,152,900 B2 * | 4/2012 | Zhou | | G01N 21/3504 423/210 |
| 8,358,417 B2 * | 1/2013 | Feitisch | | G01J 3/42 356/326 |
| 9,696,204 B2 * | 7/2017 | Liu | | G01N 21/274 |
| 9,846,117 B2 * | 12/2017 | Zhou | | G01J 3/28 |
| 2002/0175287 A1 * | 11/2002 | Busch | | G01J 3/28 250/339.09 |
| 2003/0011767 A1 * | 1/2003 | Imura | | G01J 3/28 356/326 |
| 2003/0154044 A1 * | 8/2003 | Lundstedt | | G01N 21/274 702/104 |
| 2004/0114139 A1 * | 6/2004 | Florek | | G01J 3/02 356/328 |
| 2005/0060112 A1 * | 3/2005 | Schafer | | G01R 33/4625 702/76 |
| 2005/0073690 A1 * | 4/2005 | Abbink | | G01J 3/26 356/451 |
| 2005/0236563 A1 * | 10/2005 | Busch | | G01J 3/28 250/252.1 |
| 2005/0253080 A1 * | 11/2005 | Janik | | G01J 3/10 250/372 |
| 2007/0229821 A1 | 10/2007 | Christian et al. | | |
| 2007/0246653 A1 * | 10/2007 | Zhou | | G01J 3/027 250/339.1 |
| 2008/0117405 A1 * | 5/2008 | Ridder | | G01J 3/45 356/4.01 |
| 2008/0120052 A1 * | 5/2008 | Ridder | | G01J 3/02 702/75 |
| 2008/0255769 A1 * | 10/2008 | Zhou | | G01N 21/3504 702/24 |
| 2008/0297796 A1 * | 12/2008 | Lukas | | G01J 3/28 356/326 |
| 2008/0304066 A1 * | 12/2008 | Kluczynski | | G01N 21/39 356/437 |
| 2009/0242770 A1 * | 10/2009 | Jin | | G01N 21/3504 250/339.08 |
| 2010/0010325 A1 * | 1/2010 | Ridder | | A61B 5/0075 600/310 |
| 2011/0032516 A1 * | 2/2011 | Zhou | | G01N 21/39 356/73 |
| 2011/0246145 A1 * | 10/2011 | Multari | | G01J 3/28 703/2 |
| 2011/0299076 A1 * | 12/2011 | Feitisch | | G01J 3/28 356/326 |
| 2011/0299084 A1 * | 12/2011 | Feitisch | | G01N 21/031 356/433 |
| 2012/0033220 A1 * | 2/2012 | Kotidis | | B82Y 20/00 356/445 |
| 2012/0054886 A1 | 3/2012 | van der Laan | | |
| 2012/0089344 A1 * | 4/2012 | Wright | | G01J 3/28 702/32 |
| 2012/0327959 A1 * | 12/2012 | Fermann | | H01S 3/08059 372/6 |
| 2013/0250301 A1 * | 9/2013 | Feitisch | | G01N 21/274 356/409 |
| 2014/0253922 A1 * | 9/2014 | Liu | | G01J 3/42 356/437 |
| 2015/0025851 A1 * | 1/2015 | Arai | | G01N 33/0098 702/189 |
| 2015/0142364 A1 | 5/2015 | Workman | | |
| 2015/0268095 A1 * | 9/2015 | Kovacich | | G01J 3/027 356/437 |
| 2016/0091369 A1 * | 3/2016 | Sakurai | | G01J 3/28 356/402 |
| 2016/0327479 A1 * | 11/2016 | Feitisch | | G01N 21/39 |
| 2017/0038257 A1 * | 2/2017 | Liu | | G01J 3/28 |
| 2017/0191940 A1 * | 7/2017 | Sabsabi | | G01N 21/718 |
| 2018/0130647 A1 * | 5/2018 | Tallavarjula | | H01J 37/32972 |

FOREIGN PATENT DOCUMENTS

WO   WO-2012/054886 A1   4/2012
WO      2012166572 A1   12/2012

OTHER PUBLICATIONS

Xiang, Liu. "Line-Of-Sight Absorption Of H20 Vapor: Gas Temperature Sensing In Uniform And Nonuniform Flows." Jun. 1, 2006 (Jun. 1, 2006). XP055328262, Retrieved from the Internet: URL:http://hanson.stanford.edu/dissertations/Liu 2006.pdf.; [retrieved on Dec. 12, 2016] pp. 77-106.

Benoy, et al. "Recovery of Absorption Line Shapes With Correction for the Wavelength Modulation Characteristics of DFB Lasers." *IEEE Photonics Journal* 8.3 (2016): 1-17. IEEE. Accessed on Nov. 3, 2016. http://ieeexplore.ieee.org/stamp/stamp.jsp?tp=&arnumber=7464820&isnumber=7457727.

* cited by examiner

RECONSTRUCTION OF FREQUENCY REGISTRATION FOR QUANTITATIVE SPECTROSCOPY

CROSS-REFERENCE TO RELATED APPLICATION

This application claims priority to U.S. provisional application No. 62/200,581 filed Aug. 3, 2015, the disclosure of which is incorporated herein by reference.

TECHNICAL FIELD

The subject matter described herein relates to spectroscopic analysis in general, and more specifically to approaches for achieving and maintaining accurate and reproducible frequency and/or wavelength registration of spectral data from a spectroscopic analyzer.

BACKGROUND

One or more of degradation, drift, or non-reproducibility of hardware of a spectroscopic analysis system can affect frequency and wavelength registration observed in a spectral scan obtained using the spectroscopic analysis system relative to when the spectroscopic analysis system was in a state of calibration. Accordingly, the accuracy and reproducibility of measurements made using such a system over time can degrade. As the terms are used herein, frequency and wavelength registration refer to accuracy with which a current scan reflects the frequency or wavelength scan range (e.g. the respective wavelengths or frequencies at which the scan begins and ends) as well as the frequencies or wavelengths within the scan range relative to when the spectroscopic analysis system was in its state of calibration. Registration deviation effects are generally inevitable in real-world applications of spectroscopic analysis. Hardware of a spectroscopic analysis system can include light sources (e.g. lamps, lasers, or the like), detectors, electronics, optics, mechanical components, and the like. Achieving and maintaining accurate and reproducible frequency and wavelength registration of spectral data (e.g. absorbance spectral data) can be an important consideration in quantitative spectroscopy.

In a spectroscopic analysis system based on direct absorption spectroscopy (DAS), a light source can be scanned across a wavelength range by a variety of approaches or a combination thereof, including but not limited to linearly ramping the injection current to at least one of the sections of the light source; ramping the temperature of one or more sections of the light source (e.g. in the case of a semiconductor laser); rotating one or more optical gratings; rotating one or more dispersive optical components; adjusting transmission frequencies of one or more interferometric, resonator or gain optical components of a light source; using one or more Vernier effects, electro-optic effects, thermo-optic effects, and/or acousto-optic effects; or the like. The frequency response of the light source (e.g. the frequency emitted by the light source as a function of driving current), which can include a frequency scan range (in $cm^{-1}$) and a frequency scan profile (e.g. linear vs. nonlinear behavior of the frequency response over the scan range), generally varies with changes in one or more of the operating temperature of the light source, the center value of the injection current to the light source, and time. Such changes can occur even when the operating temperature and center value of the injection current (also referred to herein as the center injection current) are kept constant.

In DAS, light emitted by the light source is passed through a sample fluid (e.g. a gas or a liquid) over a path length and ultimately directed to a detector, which provides an output signal reflective of the intensity of the light (which can be a continuous beam or pulsed) as it impinges on the detector. In DAS, these changes in intensity are attributable to absorption by one or more analytes within the sample fluid. For example, light at frequencies close to an atomic or molecular transition of a chemical species present in the sample fluid is absorbed such that the intensity of light passing through the sample fluid for such frequencies is reduced relative to the intensity emitted by the light source. This intensity difference is used in conjunction with the Lambert-Beer law to quantify the concentration of the absorbing species. The recorded DAS spectral absorption profile of the target analyte can allow quantification of the target analyte concentration by integrating over the spectral absorption profile and/or by fitting the measured spectral absorption profile to known spectral constants and Voigt-, Lorentz-, or Gaussian-absorption profiles for the target analyte. In an alternate embodiment of DAS, the shape of the spectral absorption profile of a target analyte can be used to quantify a sample fluid temperature and/or a sample fluid pressure. Accuracy of DAS can suffer with respect to a state of calibration, for example if the spectral scan characteristics of the light source change, which can lead to a distortion of the recorded spectral absorption with respect to the time of calibration of the spectroscopic instrument. Furthermore, accuracy of DAS can suffer in cases in which more than one chemical species has a significant absorbing transition at a given frequency, for example when a chemical species present in the background composition of the sample fluid (defined below) has an absorbing transition close to or coincident with an absorbing transition of a target analyte (also defined below) in the sample fluid, as well as due to low frequency noise in the detector signal (often referred to as 1/f noise), which can interfere with low concentration measurements.

In a spectroscopic analysis system based on wavelength modulation spectroscopy (WMS), which can also be referred to as harmonic spectroscopy, the frequency emitted by a light source is modulated via sinusoidally varying (e.g. at a frequency of f[Hz]) the injection current to the light source by a constant sine amplitude (in mA). The modulation can optionally be applied in addition to a wavelength scan. The wavelength scan can incorporate one or more approaches described above for a DAS system (and/or others). WMS is a widely used technique for sensitive detection and quantification of analytes at very low concentrations (e.g. in the parts-per-million or sub-parts-per-million range), and can be quite beneficial in some scenarios for reducing low frequency noise due to shifting of the analysis to higher order harmonics. In WMS, the frequency response of the spectroscopic analysis system, which includes a frequency modulation (FM) amplitude (in $cm^{-1}$), a FM profile (mixture of harmonics), and a FM phase delay (in degree) from the current modulation sine signals, generally varies with changes to one or more of operating temperature, center injection current, modulation frequency, scan width, and time. As with DAS, such changes can occur even when the operating temperature and center value of the injection current are kept constant. Also as with DAS, light emitted by the light source is passed through a sample fluid over a path length and ultimately directed to a detector, which provides an output signal reflective of the intensity of the continuous beam or pulses of light as they impinge on the detector.

However, unlike DAS, Fourier analysis of the signal generated by the detector in a WMS system includes signal components at the modulation frequency f as well as at harmonic frequencies at multiples of the modulation frequency f (e.g. 2f, 3f, 4f, etc.). Demodulation of one of the harmonic frequencies, for example the 2f, yields a signal that can be used to very accurately determine the concentration of one or more analytes in the sample fluid (whether contained within a measurement volume or otherwise) and/or a sample fluid temperature and/or pressure. In brief, the signal from the detector, which includes varying intensity data resulting from absorbance of certain frequencies by one or more species in the sample fluid, is demodulated (e.g. using a lock-in amplifier or the like). The demodulated signal contains information that can be converted into concentration values for the one or more chemical species (e.g. one or more target analytes) present in the sample fluid. By shifting phase-sensitive detection to higher frequencies, modulation spectroscopy can significantly reduce 1/f noise and achieve improved sensitivity. For example, WMS can be highly sensitive for detecting and quantifying low analyte concentrations. An analyte concentration can be quantified directly from the demodulated signal from the detector. In some applications, a peak height or a peak to valley difference can be interpreted as proportional to concentration of the chemical species absorbing light at a given frequency. As in DAS, a change in the spectral scan behavior of the light source can result in a distortion of the WMS line shape and a change of the peak and/or peak to valley height of the target analyte WMS peak, which can lead to reduced accuracy of the concentration measurement with respect to a state of calibration of the spectroscopic analysis system. Additionally, a lock-in amplifier and/or other signal filtering processes or devices can be used to isolate absorbance signals due to the analyte from background drift or other noise in the instrument. Other spectroscopic approaches can include one or more of these and optionally other features or processes.

SUMMARY

Approaches described and claimed herein can, in some aspects, relate to recording (e.g. by obtaining a field calibration spectrum) a laser frequency produced by a light source (e.g. a frequency-scannable laser) of a spectroscopic analysis system as a function of the drive current applied to the laser (or of some other operational parameter such as temperature or the like, which is varied to cause the laser frequency output to change over a desired frequency scan range). This recording can involve use of a device (examples of which are discussed in greater detail below) that provides at least relative frequency information for a plurality of data points (and optionally all data points) in a scan, such that a field spectrum representative of an absorption of radiation from the light source by a sample can be reconstructed such that the field spectrum frequency response can be directly compared to frequency responses of the spectroscopic analysis system when calibration data are collected (e.g. when the spectroscopic analysis system was in a calibration state).

In one aspect consistent with the approach discussed above, a method for passively correcting for frequency registration deviations produced by a spectroscopic analysis system includes characterizing a frequency registration deviation of the spectroscopic analysis system by recording a field calibration spectrum (also referred to herein as a field wavelength/frequency calibration spectrum) indicative of one or more changes of a light source of the spectroscopic analysis system relative to a calibrated state of the spectroscopic analysis system. A conversion function is derived that includes at least one mathematical operation for reducing the characterized wavelength/frequency registration deviation relative to the calibrated state. A field spectrum recorded with the spectroscopic analysis system for a field sample (e.g. by passing light from the light source through the sample fluid of the field sample, which can be gas or liquid) is converted by applying the conversion function to the field spectrum to produce converted field spectral data that include spectral data registered to a corrected wavelength/frequency response of the spectroscopic analysis system. A concentration for one or more analytes represented by the converted field spectral data can then be calculated, such as for example in accordance with calibration data of the spectroscopic analysis system. Alternatively or in addition, a temperature and/or a pressure of a sample fluid of the field sample can be calculated using calibration data and the converted field spectral data that include the spectral data registered to the corrected wavelength/frequency response of the spectroscopic analysis system.

In optional variations of this aspect, one or more of the following features can be included in any feasible combination. The recording of the field calibration spectrum can be done by means of a wavelength/frequency calibrator. The deriving of the conversion function can include fitting a mathematical expression to model a relative frequency difference between spectral features occurring in the field calibration spectrum and known spectral markers provided by the wavelength/frequency calibrator. The at least one mathematical operation can optionally include, without limitation, one or more of addition, subtraction, multiplication, division, differentiation, integration, point by point data correlation, and the like. The conversion function can optionally involve converting the field spectrum to a frequency axis that is linear across all or part of a scan range. Alternatively, the conversion function can result in adjusting the observed frequency response such that the frequency deviation of the field spectrum (as estimated by the field calibration spectrum) is made consistent with the frequency deviation of the spectroscopic analysis system when it was in its calibration state.

The wavelength/frequency calibrator can include at least one of an optical wavemeter; an optical interferometer; including but not limited to a fiber-, a Michelson-, a Sagnac, a Mach-Zehnder- a SWIFTS- (stationary wave integrated Fourier transform spectrometer) interferometer and the like; an etalon; an optical resonator; a frequency comb; a grating spectrometer; and a reference cell containing a calibration fluid whose absorption spectra provide multiple individually resolvable frequency markers.

The wavelength/frequency calibrator can include an optical interferometer and can further include at least one of a phase-locked-loop and a frequency synthesizer for interpolating interference fringes and increasing a frequency resolution of the interferometer.

The field spectrum can be recorded at least approximately concurrently with the field calibration spectrum. The recording of the field spectrum at least approximately concurrently with the field calibration spectrum can include simultaneously recording the field spectrum and the field calibration spectrum. The recording of the field spectrum can include sequentially recording the field spectrum and the field calibration spectrum. The recording of the field spectrum can include infrequent recording of the field calibration spectrum at preset intervals. The recording of the field spectrum can include recording the field calibration spectrum after the at least one field spectrum has been recorded.

The spectroscopic analysis system can include a beam splitter that directs a first portion of a beam emitted by the light source such that the first portion passes through the sample fluid and on to a first detector for characterizing intensity changes resulting from interaction of the first portion with the sample fluid, which are recorded in the field spectrum. The beam splitter can also direct a second portion of the beam such that the second portion passes through the wavelength/frequency calibrator and on to a second detector for characterizing intensity changes resulting from interaction of the second portion with the wavelength/frequency calibrator. The beam splitter can be any of a fiber beam splitter, a wedged plane surface plate, a curved surface optical element, a cube, a prism, an edge, a diffractive optical element, a refractive optical element, and the like.

The spectroscopic analysis system can be configured to direct at least a first portion of a beam emitted by the light source such that the first portion passes through the sample fluid and on to a first detector for characterizing intensity changes resulting from interaction of the first portion with the sample fluid, which are recorded in the field spectrum. The spectroscopic analysis system can include the wavelength/frequency calibrator positioned to receive light emitted from at least one second reflector of the light source, a back facet of the light source, and/or by high reflector (HR) leakage from the light source. The spectroscopic analysis system can further include a second detector for characterizing intensity changes resulting from interaction of the light with the wavelength/frequency calibrator.

The recording of the field spectrum at least approximately concurrently with the field calibration spectrum can include alternately recording the field spectrum and the field calibration spectrum. The recording of the field spectrum can include recording the field calibration spectrum after at least one single field spectrum and/or at regular intervals (e.g. after every third, fourth, fifth, etc. field spectrum is recorded) or irregular intervals (e.g. after some non-fixed number of field spectrum have been recorded since a previous field calibration spectrum).

The spectroscopic analysis system can include a reflector and/or beam splitter configured for being positioned in a path of a beam emitted by the light source. The reflector can direct at least part of the beam when the reflector is inserted into the path such that the at least part of the beam passes through the wavelength/frequency calibrator and on to a detector for characterizing intensity changes resulting from interaction of the at least part of the beam with the wavelength/frequency calibrator, and such that when the reflector is not inserted, the at least part of the beam is directed through the sample fluid and on to the detector or another detector for characterizing intensity changes resulting from interaction of the first portion with the sample fluid, which are recorded in the field spectrum.

The wavelength/frequency calibrator can be moveable such that the wavelength/frequency calibrator can be positioned along at least part of a beam of light emitted by the light source such that the at least part of the beam passes through the wavelength/frequency calibrator and on to a detector for characterizing intensity changes resulting from interaction of the at least part of the beam with the wavelength/frequency calibrator, and such that the wavelength/frequency calibrator can be positioned away from the at least part of the beam such that the at least part of the beam is directed through the sample fluid and on to the detector for characterizing intensity changes resulting from interaction of the first portion with the sample fluid, which are recorded in the field spectrum.

The at least one mathematical operation can include one or more of adding, subtracting, multiplying, dividing, differentiating, and integrating. The conversion function can include at least one additional different mathematical operation applied to a first part of the spectral data set but not to a second part of a spectral data set. The conversion function can include at least one of a vector and a matrix comprising values that mathematically operate on the spectral data set.

In some variations, an adjustment to at least one operating parameter of the spectroscopic analysis system necessary to reduce the characterized frequency registration deviation of the spectroscopic analysis system can be determined. The determined adjustment can then be applied to the spectroscopic analysis system. A concentration of one or more target analytes in the field sample, a pressure of the sample fluid of the field sample, and/or a temperature of the sample fluid of the field sample can then be calculated using a field spectrum recorded by the spectroscopic analysis system with the determined adjustment applied.

The adjustment to at the least one operating parameter can include a first adjustment of at least one operating parameter applied to at least a first part of a scan range of the light source and at least one second adjustment of at least one operating parameter applied to at least one second part of the scan range.

The at least one operating parameter can include one or more of a center operating value of a current provided to the light source, a temperature provided to the light source, a scan amplitude applied to the light source, a scan frequency applied to the light source, a scan profile applied to the light source, a modulation profile applied to the light source, a modulation amplitude applied to the light source, a modulation phase delay applied to the light source, a nominal current value applied to the light source, a current ramp rate applied to the light source, a laser modulation current applied to the light source, a modulation frequency applied to the light source, a phase shift applied to at least one section of the light source, an effective index of refraction change applied to at least one section of the light source, a grating angle or position, a gain setting, a filter rotation angle, a temperature of a thermal-optical filter, lock-in amplifier detection phase, and a detection gain.

The determining of the adjustment to at least one operating parameter can include use of one or more of a Newton method, a quasi-Newton method, a conjugate gradient method, an interior point method, a gradient descent method, an ellipsoid method, a reduced gradient method, a pattern search method, a heuristic based method, an artificial intelligence based method, a classical least square regression, an inverse least square regression, a principal component analysis, a component regression, a partial least square regression, and a multiple linear regression.

In another interrelated aspect, a method for actively reducing a frequency registration deviation of a spectroscopic analysis system includes determining an adjustment to at least one operating parameter of the spectroscopic analysis system necessary to reduce a frequency registration deviation of the spectroscopic analysis system relative to a predetermined laser frequency scan response of the spectroscopic analysis system. The method further includes applying the determined adjustment to the spectroscopic analysis system during a scan range used to obtain a field spectrum for a sample fluid such that the applying causes the frequency registration deviation to be reduced, and calculating a concentration for one or more analytes represented by the field spectrum recorded by the spectroscopic analysis system with the adjustment applied (e.g. using calibration data applied to the field spectrum). Alternatively or in addition, a sample fluid temperature and/or a sample fluid pressure for the field sample can be calculated using calibration data and the field spectrum recorded by the spectroscopic analysis system with the adjustment applied. The calculation of the pressure and/or temperature can involve fitting peaks of a field spectrum to obtain pressure and temperature, optionally in addition to concentration of the analyte responsible for the one or more peaks. Such an approach has been described (see, for example, "Recovery of Absorption Line Shapes With Correction for the Wavelength Modulation Characteristics of DFB Lasers" by Thomas Benoy et al. as published in the IEEE Photonics Journal in April 2016, the contents of which are incorporated herein by reference). However, existing approaches can be difficult to implement due to challenges with getting the peaks in phase (as discussed in the cited reference). The ability of the current subject matter to reduce wavelength/frequency registration deviations can address this issue with existing technologies.

In optional variations of this aspect, one or more of the following features can be included in any feasible combination. The determining of the adjustment can optionally include passing light from the light source through a wavelength/frequency calibrator and, in response to measurements by the wavelength/frequency calibrator, actuating one or more operating parameters of the spectroscopic analysis system to reduce the frequency registration deviation. The determining of the adjustment can optionally include use of a stored injection current profile for providing a scan with a known frequency axis. The known frequency axis can be linear over a scan range or non-linear over at least part of the scan range.

A method can optionally further include characterizing the frequency registration deviation of a spectroscopic analysis system, such that the characterizing can optionally include recording data indicative of one or more changes of a wavelength/frequency response of a light source of the spectroscopic analysis system relative to the predetermined laser frequency scan response of the spectroscopic analysis system, and such that the determining of the adjustment can optionally include using the data indicative of the one or more changes of the wavelength/frequency response of the light source. The determining of the adjustment can optionally include fitting a mathematical expression to model a relative frequency difference between spectral features occurring in the data indicative of one or more changes of the wavelength/frequency response of the light source of the spectroscopic analysis system relative to the predetermined laser frequency scan response of the spectroscopic analysis system and a stored calibration spectrum recorded while the spectroscopic analysis system was in the calibrated state.

Such a method can optionally further include recording the field spectrum at least approximately concurrently with the data indicative of the one or more changes of the light source of the spectroscopic analysis system relative to the predetermined laser frequency scan response, and the recording of the data indicative of the one or more changes of the light source of the spectroscopic analysis system relative to the predetermined laser frequency scan response can optionally include use of a wavelength/frequency calibrator. The recording of the field spectrum at least approximately concurrently with the data indicative of the one or more changes of the light source of the spectroscopic analysis system relative to the predetermined laser frequency scan response can optionally include simultaneously recording the field spectrum and the data indicative of the one or more changes of the light source of the spectroscopic analysis system relative to the predetermined laser frequency scan response. The spectroscopic analysis system can optionally include a beam splitter. The beam splitter can direct a first portion of a beam emitted by the light source such that the first portion passes through the sample fluid and on to a first detector for characterizing intensity changes resulting from interaction of the first portion with the sample fluid, which are recorded in the field spectrum. The beam splitter can further direct a second portion of the beam such that the second portion passes through the wavelength/frequency calibrator and on to a second detector for characterizing intensity changes resulting from interaction of the second portion with the wavelength/frequency calibrator.

The spectroscopic analysis system can be configured to direct at least a first portion of a beam emitted by the light source such that the first portion passes through the sample fluid and on to a first detector for characterizing intensity changes resulting from interaction of the first portion with the sample fluid, which are recorded in the field spectrum. The spectroscopic analysis system can optionally include the wavelength/frequency calibrator positioned to receive light emitted from a back facet of the light source and/or by high reflector leakage from the light source. The spectroscopic analysis system can optionally further include a second detector for characterizing intensity changes resulting from interaction of the light with the frequency/wavelength calibrator.

The recording of the field spectrum at least approximately concurrently with the data indicative of the one or more changes of the light source of the spectroscopic analysis system relative to the predetermined laser frequency scan response can optionally include alternately recording the field spectrum and the data indicative of the one or more changes of the light source of the spectroscopic analysis system relative to the predetermined laser frequency scan response.

The spectroscopic analysis system can optionally include a reflector configured to be inserted into a path of a beam emitted by the light source. The reflector can direct at least part of the beam when inserted into the path such that the at least part of the beam passes through the wavelength/frequency calibrator and on to a detector for characterizing intensity changes resulting from interaction of the at least part of the beam with the wavelength/frequency calibrator. When the reflector is not inserted, the at least part of the beam can be directed through the sample fluid and on to the detector or another detector for characterizing intensity changes resulting from interaction of the first portion with the sample fluid, which are recorded in the field spectrum.

The wavelength/frequency calibrator can be moveable such that the frequency/wavelength calibrator can be positioned along at least part of a beam of light emitted by the light source such that the at least part of the beam passes through the wavelength/frequency calibrator and on to a detector for characterizing intensity changes resulting from interaction of the at least part of the beam with the wavelength/frequency calibrator. The wavelength/frequency calibrator can be positioned away from the at least part of the beam such that the at least part of the beam is directed through the sample fluid and on to the detector for characterizing intensity changes resulting from interaction of the first portion with the sample fluid, which are recorded in the field spectrum.

The wavelength/frequency calibrator can optionally include at least one of a wavemeter, an interferometer, an etalon, an optical resonator, a frequency comb, and a reference cell containing a calibration fluid whose absorption spectra provide multiple frequency markers. In some examples, the wavelength/frequency calibrator can optionally include an interferometer and can optionally further include at least one of a phase-locked-loop and a frequency synthesizer for interpolating interference fringes and increasing a frequency resolution of the interferometer.

The adjustment to at least one operating parameter can optionally include a first adjustment of an operating parameter applied to a first part of a scan range of the light source and a second adjustment of the operating parameter applied to a second part of the scan range.

The at least one operating parameter can optionally include one or more of a center operating value of a current provided to the light source, a scan amplitude applied to the light source, a scan frequency applied to the light source, a scan profile applied to the light source, a modulation profile applied to the light source, a modulation amplitude applied to the light source, a light source modulation phase delay, a nominal current value applied to the light source, a current ramp rate applied to the light source, a laser modulation current applied to the light source, a modulation frequency applied to the light source, a grating angle or position, a filter rotation angle, a temperature of a thermal-optical filter, lock-in amplifier detection phase, a detection gain, a light source operating temperature.

The determining of the adjustment to at least one operating parameter can optionally include use of one or more of a Newton method, a quasi-Newton method, a conjugate gradient method, an interior point method, a gradient descent method, an ellipsoid method, a reduced gradient method, a pattern search method, a heuristic based method, a classical least square regression, an inverse least square regression, a principal component analysis, a component regression, a partial least square regression, and a multiple linear regression.

A method can optionally further include further reducing the characterized frequency registration deviation by iterating through one or more additional cycles of characterizing the frequency registration deviation, determining an additional adjustment to the at least one operating parameter, and applying the determined additional adjustment to the spectroscopic analysis system; and stopping the iterating when the characterized frequency registration deviation is smaller than a predefined threshold amount.

A light source consistent with all aspects of the subject matter can optionally include at least one of a tunable diode laser, a semiconductor laser, a semiconductor optical amplifier, a quantum cascade laser, an intra band cascade laser, a horizontal cavity laser, a vertical cavity surface emitting semiconductor laser, a distributed feedback laser, a distributed Bragg reflector laser, an amplified distributed feedback laser, an amplified distributed Bragg reflector laser, a multi-element grating coupled distributed feedback laser, a multi-element grating coupled distributed Bragg reflector semiconductor laser, a gas discharge laser, a liquid laser, a solid state laser, a diode pumped solid state laser, a fiber laser, a sum frequency mixing non-linear optical process, a difference frequency mixing non-linear optical process, an optical parametric oscillator, an external cavity diode laser, an extended cavity diode laser, a light emitting diode, a super luminescent light emitting diode, an amplified spontaneous emission source, a super-continuum optical source, and a lamp.

Systems and methods consistent with these approaches are described as well as articles that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein. Such computer systems can be implemented as or as part of a controller unit for a spectroscopic analysis system. Additionally, in various aspects, systems can include one or more components of a spectroscopic analysis system, such as for example a light source; a detector; a sample cell; optical components for reflecting, splitting, or otherwise directing light; temperature control components; and computer or other electronic circuitry for controlling the components and/or collecting and analyzing data.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
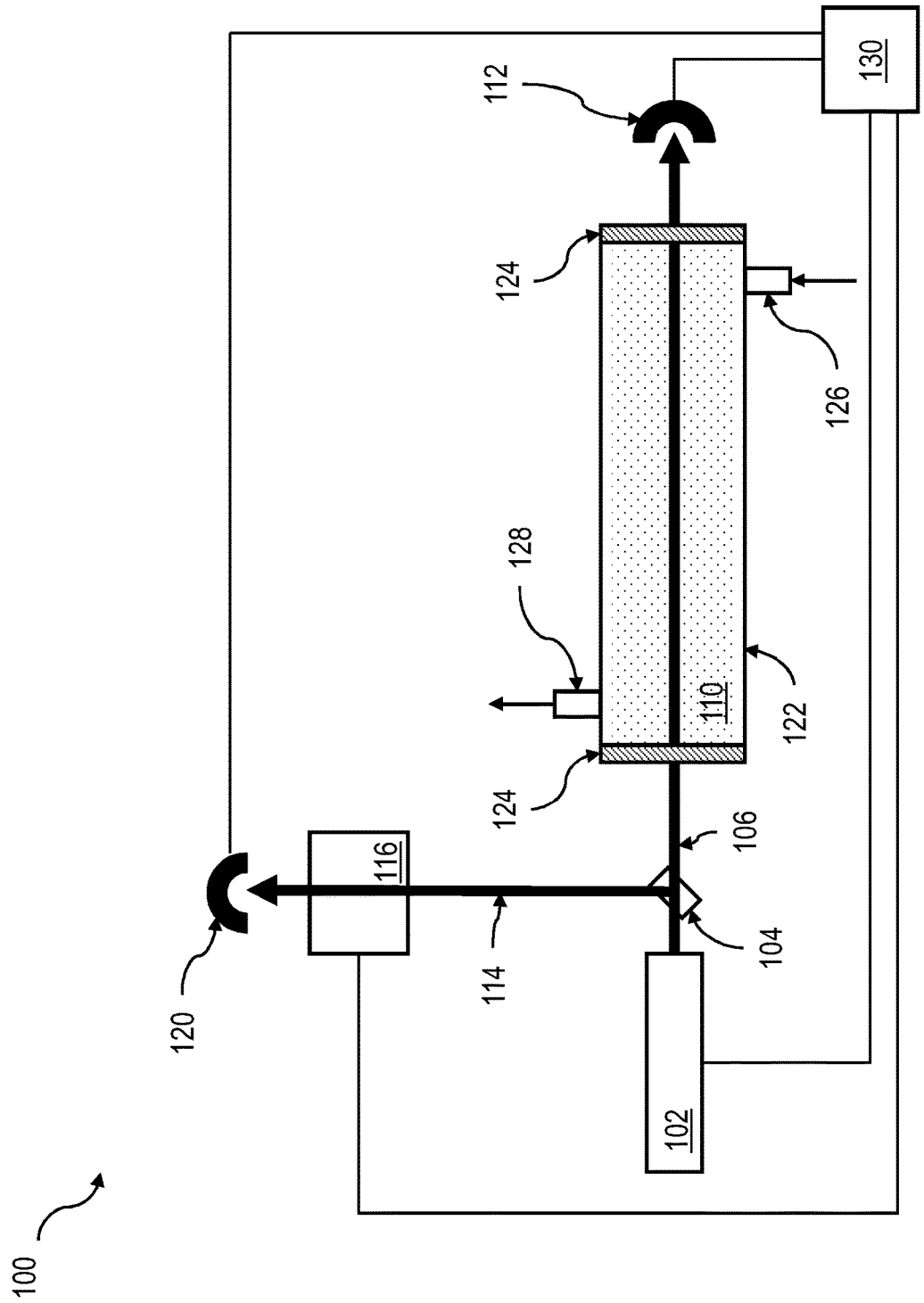
FIG. 1 shows a diagram illustrating an example of a spectroscopic measurement system consistent with implementations of the current subject matter.

Scanned wavelength/frequency spectroscopy is used in many industrial applications, where the wavelength/frequency of the light propagating through a measurement volume of a sample fluid is changed with time periodically by a certain amount (e.g. as quantified in units such as MHz, GHz, fm, pm, nm, $cm^{-1}$, or the like) to cover at least a portion of one absorption peak of a target analyte and/or background species (e.g. other compounds present in a sample fluid that may include overlapping spectral features that can interfere with analysis of a concentration of an analyte). The changing of the light wavelength/frequency can be realized via a broadband light source by tuning a wavelength/frequency filter, and/or via manipulation of a monochromatic light source by tuning at least one of its wavelength determining operating current, temperature, dispersive elements, Vernier effects, acousto-optic modulators, electro-optic modulators, interferometric components, grating structures, or the like.

Shifting of the frequency of light emitted by a light source (e.g. a laser) of a spectroscopic analysis system can occur from scan to scan and over time, due to one or more of a number of factors, which can include but are not limited to aging of a laser, environmental impacts on the laser, aging of the electronic driver and detector circuitry, environmental impacts on the electronic circuitry, etc. These and other factors can affect laser and non-laser spectroscopic light sources used in spectroscopic analysis systems. The shifts can affect the endpoints of a scan (e.g. start and stop wavelength/frequency) as well as wavelength/frequency registration of wavelengths within the scan range. The wavelength/frequency response of a light source can generally be driven thermally, and can drift with even small changes of the operating current or the temperature of the light source (e.g. of the quantum well of a semiconductor laser), for example as controlled by a thermo electric cooling (TEC) unit. Numerical shifting of a recorded spectrum for a sample fluid can be used to correct a simple linear shift of the wavelength/frequency emitted by the light source. However, in practice, a shift in wavelength/frequency due to changes in operating current and/or other factors can result in either a contraction or stretching of a recorded DAS or WMS spectrum, which, can in turn, create an offset to a measured concentration calibration. Such shifts (e.g. contraction and/or stretching) may not be constant through a scan range. For example, wavelength registration deviation relative to a calibration state in one part of a scan range can differ from that in another part of the scan range.

Achieving and maintaining accurate and reproducible wavelength/frequency and registration of absorbance spectral data can be an important consideration in quantitative spectroscopy. However, the wavelength/frequency response of a spectroscopic analysis system is generally assumed to not change, especially when using advanced light sources (such as lasers). Accordingly, it is uncommon to monitor or correct the wavelength/frequency response over time, within a wavelength/frequency scan, etc., with respect to the frequency response underpinning calibration of the spectrometer. In general, if the wavelength/frequency response of the light source of a spectroscopic analysis system (e.g. the wavelength/frequency generated in a scan as a function of the driving current or other parameter used to control the variable wavelength/frequency emitted) varies over time or from one laser scan to another, errors can arise in determining analyte concentrations because the peaks whose heights or other parameters are quantified can shift unpredictably relative to their expected position within a scan. In addition, changes in the light source wavelength/frequency scan behavior can distort the analyte peaks unpredictably with respect to height, shape, location, etc. of such peaks resulting from use of the spectroscopic analysis system at a time when the spectroscopic analysis system was in a state of calibration. Furthermore, especially in WMS, peak heights of the demodulated harmonic signal can depend upon one or more non-linear effects occurring during the light source wavelength/frequency scan, including but not limited to the scan behavior of the light source, the optical systems, and/or the electronic detection and demodulation system, thereby causing a measurement offset from a calibration state of the spectroscopic analysis system.

Currently available approaches for addressing degradation, drift, and/or non-reproducibility of measurements performed using spectroscopic analysis systems have included reference cell technologies that use in-line or split beam path configurations, periodic checks of frequency and/or wavelength response using validation gas or gas mixtures, and one or more strong spectral peaks of a target analyte and/or another "background" compound present in a sample fluid to correct for frequency response changes. However, while such approaches generally can be used to correct linear wavelength/frequency response changes, for example by directly quantifying and correcting the spectral response difference between the calibration state and field measurement state of a spectroscopic analysis system, such approaches typically provide fewer benefits in correcting for non-linear wavelength/frequency response changes without resorting to very complicated mathematics and/or requiring significant computational resources while also relying on assumptions about causes of frequency response deviations, which may not reflect real conditions. Periodic frequency or wavelength response checks using one or more standard gases or gas mixtures can require switching mechanisms for a fluid (e.g. gas or liquid) containing a known concentration of the target analyte or another compound (which may or may not be present in the process sample fluid) that absorbs light in the target wavelength/frequency region, in addition to a supply of the consumable standardized fluid. Validation gas mixtures with suitable analyte concentrations and representative gas mixes, which support wavelength/frequency response checks of a spectroscopic analyzer in the field, are expensive consumables and are typically not available in remote locations, for example many parts of Africa, Asia, Siberia and the like, where natural gas is being produced or processed. Such an approach can also interrupt continuous process measurements, which can lead to significant measurement blind time while performing system validations. Peak tracking approaches can be susceptible to background fluid composition changes as well as temperature and pressure effects.

Among other possible advantages or benefits that may be associated with implementations of the current subject matter, robust, reliable, and reproducible measurements can be achieved and maintained. A general advantage that can be realized by such approaches is the conversion of spectral data that are reliant on the assumption that wavelength/frequency response of the light source is linear with time, laser injection current, and/or some other parameter, to one in which a standardized frequency registration is either a) provided through modification or control of one or more spectroscopic analysis system operation parameters or b) reconstructed for an existing field spectrum to correct for any nonlinearities in spectral response or other deviation relative to a calibration state of the spectroscopic analysis system. These and/or other possible advantages can provide significant improvement in performance, calibration fidelity, measurement robustness against ambient and fluid composition changes, reduced validation effort and time, improved "up time," and the like of a spectroscopic analysis system, for example in enabling comparison with library spectra recorded (e.g. stored, etc.) in databases (or other storage formats) at a time of calibration of the spectroscopic analysis system and/or in enabling use of universal calibration models (independent of light source, electronics, and other hardware components of the system). Such universal calibration models can also allow field repair and/or correction of the spectroscopic analysis system, without need for factory and/or field calibration and related significant measurement downtime, regardless of which component or subsystem fails or experiences degradations, etc., including the light source, the optical system, and the electronic circuitry. Such field repair and/or correction is not possible with the present state of the art of spectroscopic analysis systems.

In some implementations of the current subject matter, a relative or absolute frequency shift of the light source over an applied linear current ramp (or ramp of another parameters such as temperature, etc.) is recorded using an optical interferometer (such as for example a wavelength/frequency calibrator as described in more detail below), and a spectral absorption response is also recorded for a sample fluid. Recording of the relative or absolute wavelength/frequency shift of the light source over the applied linear current ramp refers to use of a "standard" or otherwise invariable set of spectral "guideposts," which provides a linear wavelength/frequency scale against which the spectral response of the light source can be compared so that adjustments can be made to "linearize" the spectral response observed in an at least approximately concurrently recorded field spectrum of a sample fluid.

Alternatively, the spectral absorption response need not be linearized, but can instead be converted to a known and well-characterized wavelength/frequency scale, which can have arbitrary characteristics. In this example, the wavelength/frequency scale can optionally be linear over all or part of the scan range. For example, the wavelength/frequency scale can include more than one linear part, each having a different scale. Alternatively, the wavelength/frequency scale can be non-linear over all or part of the scan range, such as for example a polynomial function, an exponential or logarithmic function, or some other relationship, such as for example one defined by a lookup table or by multiple conversion operations. The approach in this example can be similar to that described above for linearizing the wavelength/frequency scale. The relative or absolute wavelength/frequency shift of the light source over the applied current ramp (or other scan driving parameter such as temperature, etc.) can be characterized by reference to a "standard" or otherwise invariable set of spectral "guideposts." This can be done when the spectroscopic analysis system is in its calibration state and the resultant calibration state frequency deviations from the "standard" or otherwise invariable set of spectral "guideposts" can be stored as a function of (or otherwise in relation to) whatever operational parameter (e.g. time, driving current, temperature, etc.) is used in characterizing the scan range. The wavelength/frequency deviations detected for the field wavelength/frequency calibration spectrum (generally referred to herein as a field calibration spectrum) can be used in conjunction with the stored calibration state wavelength/frequency deviations to determine a conversion function necessary to adjust a current wavelength/frequency registration deviation characterized by the field calibration spectrum to be equivalent to the stored calibration state wavelength/frequency deviations. In this manner, a field spectrum obtained while the spectroscopic analysis system is in a state that is well-characterized by the field calibration spectrum can be converted such that the spectral response over the scan range is properly registered to the calibration state of the spectroscopic analysis system.

The spectroscopic analysis system can be assumed to be in a state that is well-characterized by the field calibration spectrum when the field calibration spectrum is obtained sufficiently closely in time to the field spectrum it is used to convert that any wavelength/frequency registration deviation of the spectroscopic analysis system is small during any intervening time between the field calibration spectrum and the field spectrum being obtained. The term "at least approximately concurrently" is used herein to refer to recording of the relative or absolute frequency shift and the spectral absorption response for the sample fluid occurring with sufficiently close temporal proximity to allow the measurement of the frequency shift of the light source to be used to accurately correct a spectral registration of the field spectrum. In other words, the field spectrum and the field calibration spectrum are collected sufficiently close in time that any frequency registration deviation relative to the calibration state of the spectroscopic analysis system that is present in the field calibration spectrum can be assumed to similarly also occur in the field spectrum. For example, the two measurements (field spectrum and field calibration spectrum) can occur simultaneously (e.g. using a beam splitter such that light from the light source is split and measured by more than one detector) or sequentially (e.g. by alternately passing light from the light source through the sample fluid to a detector and through a calibrator and on to a same or different detector or by alternately recording spectral scan from light from the light source passing through the sample fluid of the field sample and/or a calibrator on the same or different detectors). Approaches in which measurement of the relative or absolute wavelength/frequency shift of the light source over the applied linear current ramp occurs periodically (e.g. by obtaining a field calibration spectrum at some time interval, after a certain number of field spectra are recorded, or at some arbitrary time) are also within the scope of the current subject matter.

Using the recorded relative or absolute wavelength/frequency shift of the light source, a current spectral response of the light source over a linear current ramp can then be reconstructed as a function of the linear wavelength/frequency registration, which can be obtained interferometrically. In some optional variations, the resolution of an optical interferometer used as the wavelength/frequency calibrator 116 can be increased by interpolating between transmission peaks, for example by using a phase locked loop (PLL) circuit, which can multiply the number of transmission peaks counted by 10× to 100× to 1000× to thereby increase a frequency space resolution of a wavelength/frequency calibrator. A very fine-grained wavelength/frequency scale resolution can assist with registration and spectral overlay accuracy and thus calibration fidelity and differential spectroscopy measurement cycle times (e.g. between "dry" cycles in which sample gas is scrubbed or otherwise treated to remove or at least reduce a concentration of a target analyte), for example when implementations of the current subject matter are used as part of a differential absorption spectroscopy approach such as those described in co-owned U.S. Pat. No. 7,586,094. In other implementations, a more coarse-grained wavelength/frequency scale resolution can be used (e.g. a very fine-grained wavelength/frequency scale resolution is not a necessary aspect of the current subject matter).

In effect, certain aspects of the current subject matter can include checking a wavelength/frequency scale resolution frequency response of the light source against a known standard provided by an interferometer. A sufficiently fine-grained interferometer signal can provide a series of regularly-spaced guide points that serve as a reference against which the frequency response of the spectroscopic analysis system is corrected such that a field spectrum can be converted to provide a corrected, accurate measurement of transmitted light intensity variations detected by the detector against an actual frequency of light. Such an approach is desirable in that it does not rely on any assumption that the wavelength/frequency response of the light source is linear with time, injection current, etc., and also does not rely on any assumptions about reproducibility of a non-linear relationship between the wavelength/frequency response and time, injection current, or any other parameter. Instead, whatever the current wavelength/frequency response of the light source, a field spectrum can be converted to indicate observed intensity versus actual wavelength/frequency.

Example implementations of the current subject matter are described herein in relation to both direct absorption spectroscopy (DAS) and harmonic spectroscopy (WMS) techniques using a tunable diode laser absorbance spectrometer (TDLAS) or tunable semiconductor laser spectrometer. However, approaches consistent with the current subject matter can also be used in conjunction with analytical instrumentation or methods relating to any quantitative spectroscopic approach, including but not limited to absorption, emission, and fluorescence spectroscopy, such as, for example, Fourier transform infrared (FTIR) spectroscopy, non-dispersive infrared (NDIR) spectroscopy, cavity enhanced spectroscopy (CES), cavity ring-down spectroscopy (CRD), integrated cavity output spectroscopy (ICOS), photoacoustic spectroscopy, Raman spectroscopy, optical feedback cavity enhanced absorption spectroscopy (OF-CEAS), and the like.

The term spectral data refers to data quantifying one or more of an absorbance, a reflectance, a fluorescence, a scattering, or an emission occurring in response to incident light interacting with molecules of a sample fluid such as a gas or a liquid in a spectroscopic analysis system. Terms used in this disclosure in describing changes to spectroscopic analysis system performance that can occur as a result of hardware variations over time include frequency registration (FR) (or wavelength registration), which refers to an alignment of a frequency (or wavelength) axis (commonly the x-axis) of spectral data and wavelength or frequency registration deviation (FRD), which refers generally to any changes or deviations to the frequency axis of spectral data obtained from a spectroscopic analysis system.

Spectral data refers to one or more sets of spectroscopic data collected using a spectroscopic analysis system. The terms field "spectral data" or "field spectrum" refer to spectroscopic data collected using a spectroscopic analysis system to analyze one or more field samples. Calibration spectral data refers to spectroscopic data collected using a spectroscopic analysis system to analyze one or more calibration samples. Field sample is the term used herein to refer to a sample fluid (e.g. gas or liquid) containing an unknown quantity of one or more analytes of interest (also referred to herein as a target analyte or target analytes), which can be present in a background composition that can contain one or more other compounds, which can be present in unknown and/or time varying concentrations. A calibration sample is one for which one or more analyte concentrations are known or well characterized. An analyte refers generally to an element or a compound having one or more spectral features for which the spectroscopic analysis system is configured to capture spectral data. A spectral measurement state refers to a state of the hardware of the spectroscopic analysis system at the time that spectral data are collected.

A calibration or calibrated state refers to a state of the hardware of the spectroscopic analysis system when the spectroscopic analysis system is calibrated, for example when calibration spectral data are collected. Calibration spectral data refer to spectral data collected using a spectroscopic analysis system to analyze one or more calibration samples having a known or well-characterized amount of an analyte or some other element or compound and optionally one or more other known or well-characterized measurement parameters, such as for example temperature, pressure, a background composition of the calibration sample, etc. A calibration state can reflect an original factory calibration of the spectroscopic analysis system or a calibration occurring at some subsequent time during the functional lifetime of the spectroscopic analysis system. A field wavelength/frequency registration calibration can be represented in a field calibration spectrum recorded at least approximately concurrently with a field spectrum of a field sample as described elsewhere herein, and can be indicative of one or more changes (e.g. wavelength/frequency registration deviations) in wavelength/frequency response of the light source of a spectroscopic analysis system relative to the calibrated state of the spectroscopic analysis system. A spectroscopic analysis system can be in a calibration state when it is first assembled or delivered or at a later time when a calibration process is completed for the spectroscopic analysis system.

A conversion function, as used herein, refers to a mathematical operation or set of mathematical operations that result in a transformation of a set of data. Consistent with some implementations of the current subject matter, a conversion function is determined based on a calibration data set and then used to transform an at least approximately concurrently recorded field spectrum for a field sample. An example of a conversion function is a vector or matrix that includes values that mathematically operate on a spectral data set. Examples of mathematical operations that can be performed on a spectral data set can include adding, subtracting, multiplying, dividing, differentiating, integrating, or the like. A conversion function can include different operations for different parts of a spectral data set. Application of a conversion function consistent with implementations of the current subject matter to a field spectrum can produce converted field spectral data that include spectral peaks registered to corrected wavelength/frequency responses of the spectroscopic analysis system. In other words, recognizing that the wavelength/frequency response of the light source may not be linear with the applied injection current or with time (e.g. assuming a linearly increasing injection current with time), a field spectrum can be converted using the conversion function to a wavelength/frequency space such that the resulting converted field spectral data include spectral features (e.g. peaks, valleys, etc. indicative of spectral transitions occurring in a sample fluid) that are accurately registered to the actual light source wavelength/frequency at which the spectral features occur.

FIG. 1 shows a diagram of an example spectroscopic analysis system 100, which includes features that may appear in other spectroscopic analysis systems consistent with implementations of the current subject matter. The spectroscopic analysis system 100 can include a light source 102 operating at one or more target wavelengths/frequencies or over a range of wavelengths/frequencies. The light source 102 provides a beam that includes either continuous wave radiation or pulses of radiation (e.g. light in the visible, ultraviolet, infrared, or the like, or other types of electromagnetic radiation) emitted to pass through a beam splitter 104 such that a first portion of the beam 106 passes through a measurement volume 110 of a sample fluid before being detected by a first detector 112 and a second portion of the beam 114 passes through a wavelength/frequency calibrator 116 and on to a second detector 120.

The light source 102 can optionally include one or more lasers, for example a tunable diode laser (TDL), a semiconductor laser, a semiconductor optical amplifier (SOA), a quantum cascade laser (QCL), an intra band cascade laser (ICL), a horizontal cavity surface emitting laser, a vertical cavity surface emitting semiconductor laser (VCSEL), a distributed feedback laser (DFB), a distributed Bragg reflector laser (DBR), an amplified, (including but not limited to trapezoidal amplifiers) DFB or DBR laser, a multi-element grating coupled DFB or DBR semiconductor laser, a gas discharge laser, a liquid laser, a solid state laser, a diode pumped solid state (DPSS) laser, a fiber laser, a sum frequency mixing non-linear optical process, a difference frequency mixing non-linear optical process, an optical parametric oscillator, an external cavity diode laser, an extended cavity diode laser, and the like. The light source 102 can also or alternatively include one or more of light emitting diodes (LED), super luminescent light emitting diodes (SLED) amplified spontaneous emission (ASE) sources, super-continuum optical sources, lamps (e.g. incandescent, discharge, thermal, laser assisted or laser driven plasma, etc.), or other similar devices capable of generating frequency tunable light through nonlinear optical interactions and/or through spectral filtering. Also included within the scope of the current disclosure are examples such as widely tunable semiconductor lasers and/or QCL and/or ICL sources with the likes of tunable grating type waveguide filters and/or interferometric filters and/or phase shifters and the like inside the optical resonator (e.g. those available from Redshift Systems of Burlington, MA, FAZ Technologies of Dublin, Ireland, BaySpec of San Jose, CA, Pure Photonics of San Jose, CA, and various manufacturers of telecommunication-grade lasers).

The beam splitter 104 can include one or more of any partially reflecting mirror, such as for example a dielectric mirror, a thin metal-coated mirror, a beam splitting cube, a prism, an edge, a diffractive optical element, a refractive optical element, a Fresnel reflector, a pellicle, a micro-optic beam splitter, a waveguide beam splitter, a wedged plane surface plate, a curved surface optical element, a fiber beam splitter, or the like. The beam splitter 104 can be put in line (e.g. in line to split the beam) all of the time, or intermittently (e.g. whenever wavelength/frequency registration calibration is needed).

The first and second detectors 112, 120 can include one or more of a photodiode, a photodetector, a photoacoustic detector, a bolometer, or other devices or structures for detecting an intensity of the radiation received. For example, the first detector 112 detects and quantifies received radiation of the first portion 106 of the beam after the first portion 106 has passed at least once through the measurement volume 110, and the second detector 120 detects and quantifies received radiation of the second portion 114 after it passes through the wavelength/frequency calibrator 116.

The wavelength/frequency calibrator 116 can be any wavemeter or interferometer, such as a Fabry-Pérot (FP) interferometer or etalon, a Fizeau interferometer, a Mach-Zehnder Interferometer, a Michelson interferometer, a Sagnac interferometer, a fiber interferometer, a quadrature interferometer (e.g. such as those available from TEM Messtechnik GmbH of Hannover, Germany, and/or those described in U.S. Pat. No. 6,178,002 and German Patent No. 19743493C2), a SWIFTS interferometer (e.g. such as those described in U.S. Pat. No. 7,450,340), a frequency comb, a nano-scale photonic structure, or the like. The wavelength/frequency calibrator can optionally be incorporated in a waveguide and/or in a photonic integrated circuit (PIC), and/or in an optical resonator and/or in a hollow etalon. One or more phase-locked-loops or any other frequency synthesizer can be used to interpolate the interference fringes and increase the frequency resolution. The wavelength/frequency calibrator 116 can optionally include a reference cell containing a calibration fluid (e.g. a gas or liquid) whose absorption spectra provide multiple well-defined and individually resolvable frequency markers (e.g. peaks, valleys, zero-crossing points, etc.) that occur at well-defined frequencies. For example, the reference cell can contain a gas or mixture of gases selected to have a set of well-defined transitions that result in a set of discernible spectral features spaced throughout a scan range of the light source of the spectroscopic analysis system. With the reference cell maintained at a well-characterized temperature and pressure, the set of discernible spectral features can be used in a manner similar to the peak structure generated by the other examples described herein for a wavelength/frequency calibrator 116 consistent with the current subject matter. Furthermore, a frequency calibrator 116 containing a reference fluid cell and/or an interferometer can be used to determine the absolute wavelength/frequency of the emitted light and/or to repeatedly set the light source to at least one or more pre-determined wavelengths/frequencies of the sample gas by means of a feedback loop actuating at least one wavelength/frequency changing process, such as adjustments to a semiconductor injection current, light source temperature, or the like. The wavelength/frequency changing process of the light source, which can be required for a spectral scan, can be achieved in some implementations of the current subject matter in at least approximately real time, for example by operation of a feedback control loop containing the light source and the wavelength/frequency calibrator. Alternatively, the wavelength/frequency changing process can be achieved by reading out combinations of light source operating parameters, which have been previously characterized and stored in an electronically readable medium, using the wavelength/frequency calibrator. Optionally, the light source wavelength/frequency controlling feedback loop can contain a microprocessor. In some implementations of the current subject matter, the wavelength/frequency calibrator 116, which can optionally include a commercial wavemeter or spectrometer, can include the second detector 120 (and optionally also the first detector 112) and related data acquisition and signal processing hardware and/or software as part of an integrated electronics package.

In some implementations, the measurement volume 110 can be contained in a sample cell 122 having one or more windows or other openings 124 through which a path of the first portion of the light beam 106 passes into and out of the measurement volume 110. The sample cell 122 can be a flow-through cell as shown in FIG. 1, in which fluid flows into the sample cell 122 via an inlet 126 and out of the sample cell 122 through an outlet 128. In other implementations of the current subject matter, an analytical system can omit a sample cell and can instead be configured such that the first portion of the light beam 106 passes at least once through an open (e.g. unbounded or unenclosed) space of "free volume" (e.g. within a stack, in the open atmosphere, etc.) in traversing between the beam splitter 104 and the first detector 112. In an open path system consistent with this implementation, the path of the first beam portion 106 can optionally include one or more reflections via mirrors or other reflective surfaces arranged within or adjacent to the open space volume.

In still other implementations of the current subject matter, a fiber-coupled configuration can include a fiber coupler/splitter as the beam splitter 104 and a fiber interferometer as the wavelength/frequency calibrator 116.

The system 100 can also include a controller 130 for data acquisition and signal processing (e.g. to receive and analyze the detector data from the first detector 112 and the second detector 120 and from the wavelength/frequency calibrator 116), to control the light source 102, and optionally to perform one or more of the operations discussed below in relation to virtual reconstruction of a calibration state of the spectroscopic analysis system 100.

Other configurations consistent with implementations of the current subject matter are possible besides that of the system 100 shown in FIG. 1. For example, a path length of the first beam portion 106, which is the distance the continuous beam or pulses of radiation travels through the measurement volume 110, can be established using mirrors, additional beam splitters, or by varying other geometrical parameters such as the location of the light source 102 or beam splitter 104 and/or the first detector 112. Furthermore, the measurement volume 110 can contain a non-enclosed open path between the light source 102 and/or beam splitter 104 and the first detector 112 as noted above. For example, depending on the analyte or analytes to be measured, the concentration range over which one or more analytes are expected to be present, and the presence of other compounds or materials that might interfere with the accuracy of a measurement in the sample, the continuous beam or pulses of light can be projected through free fluid (such as for example in a pipeline) or even free air or liquid. Alternatively, a batch volume of sample fluid can be analyzed in a sample cell 122, for example one such as that shown in FIG. 1 with additional conduits or tubing, valves, and/or vacuum or pumping equipment to deliver a first batch volume and remove that first batch volume from the sample cell 122 to prepare for analysis of a second batch volume.

In some optional implementations of the current subject matter, the beam splitter 104 can be omitted. In place of the beam splitter 104, a reflector can be inserted into the beam path intermittently to thereby divert at least part of (or optionally the entire) beam to the wavelength/frequency calibrator 116 whenever wavelength/frequency response calibration is needed. In such a configuration, the beam passing through the wavelength/frequency calibrator 116 can be directed to a same detector (e.g. the first detector) used for sample measurement, or to a different detector. Alternatively, other configurations of a spectroscopic analysis system can include a movable wavelength/frequency calibrator 116 and sample cell 122 that can be alternatively positioned along a beam of light between the light source 102 and a detector such that the beam of light passes through the sample cell 122 during collection of a field spectrum and through the wavelength/frequency calibrator 116 during collection of a calibration spectrum. In some implementations of the current subject matter, light emitted from at least one second reflector and/or a back facet of a laser source or leakage of light from the high reflector (HR) of a laser source can be directed through the wavelength/frequency calibrator 116 and on to a detector (e.g. to a single detector used for alternately obtaining calibration spectral data and field spectral data or to two or more different detectors).

Figure 2:
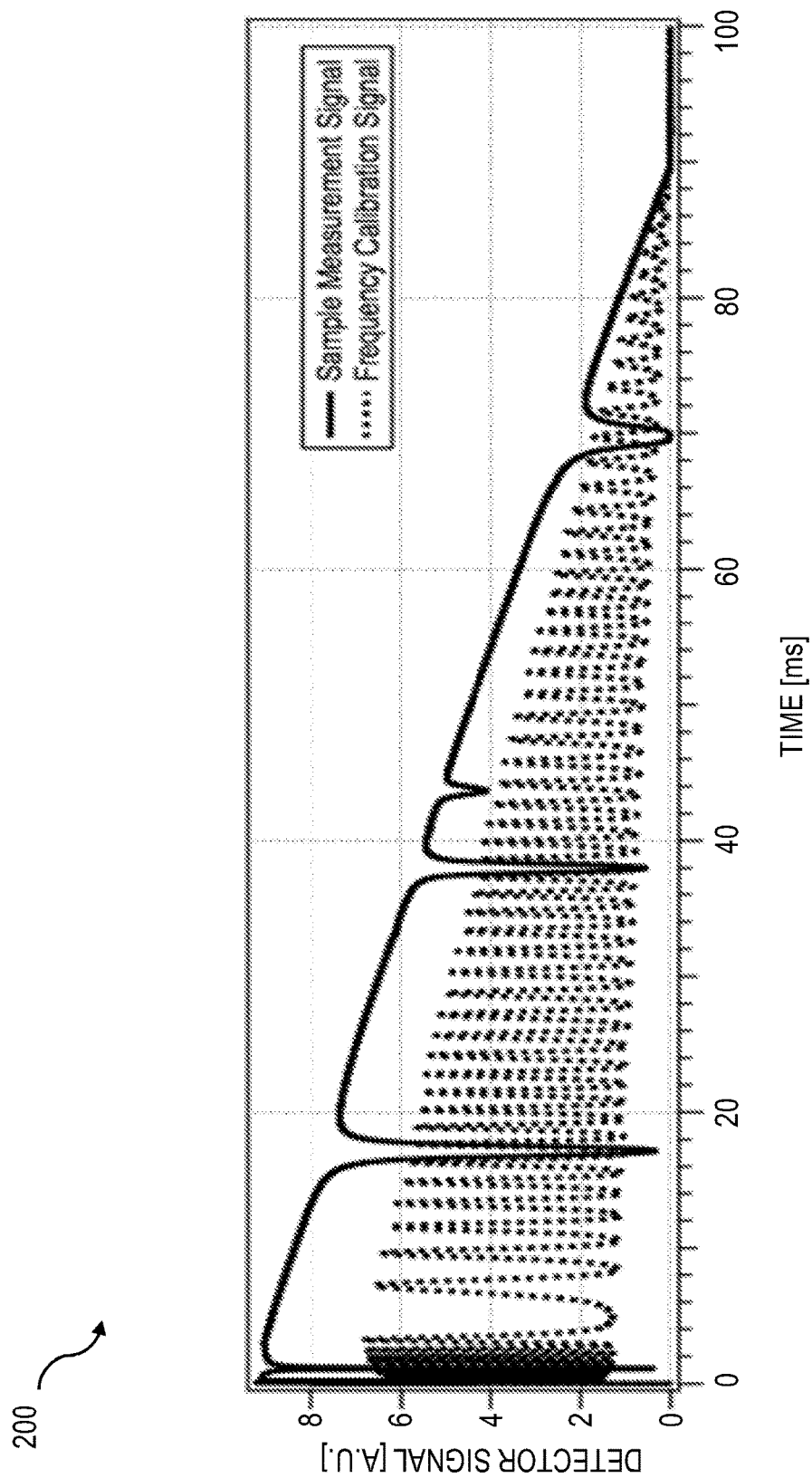
FIG. 2 shows a chart illustrating an example of a sample measurement signal generated by a DAS system.
Figure 3:
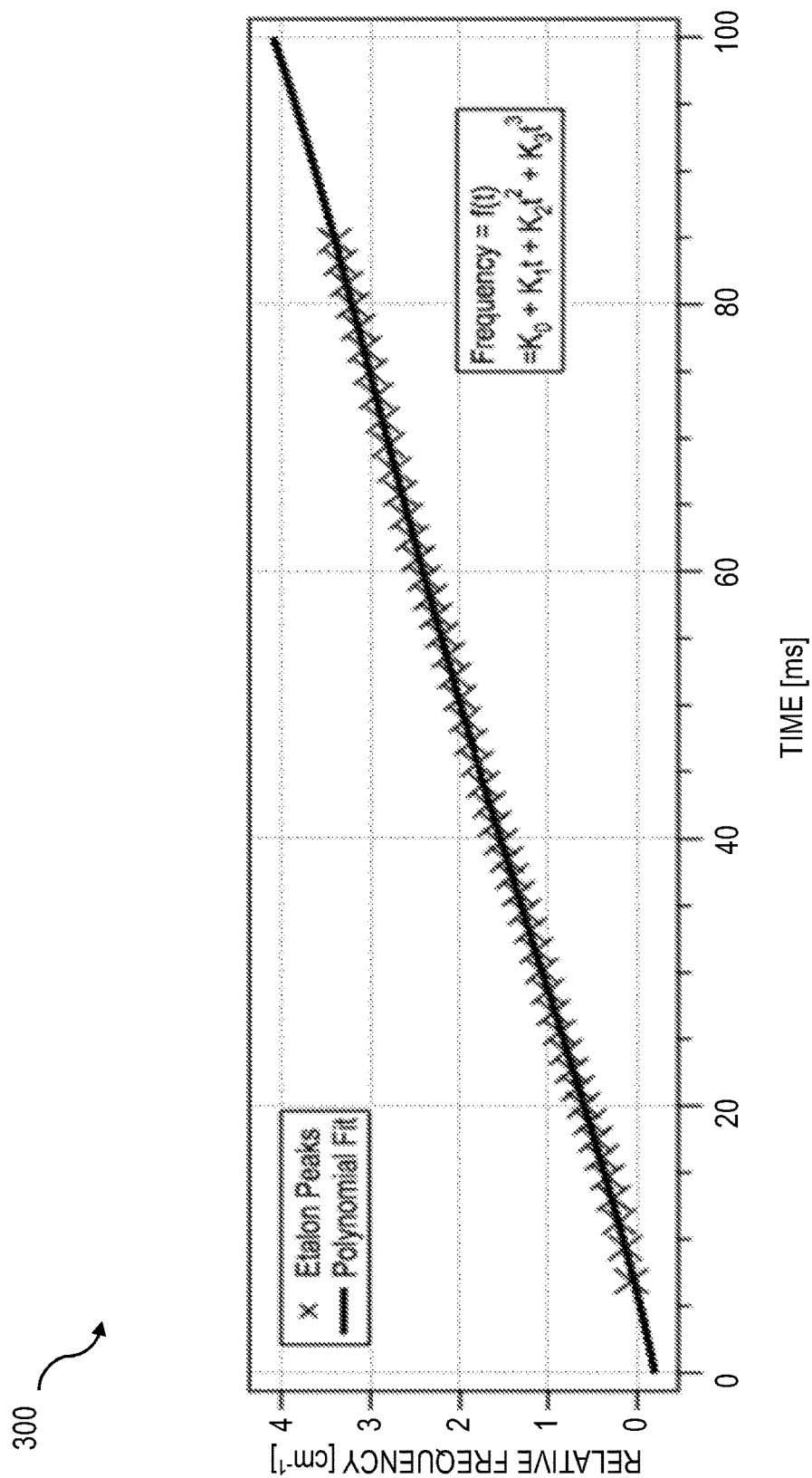
FIG. 3 shows a chart illustrating an example of a frequency calibration signal processed to identify the frequency response of the system versus time for the DAS system.
Figure 4:
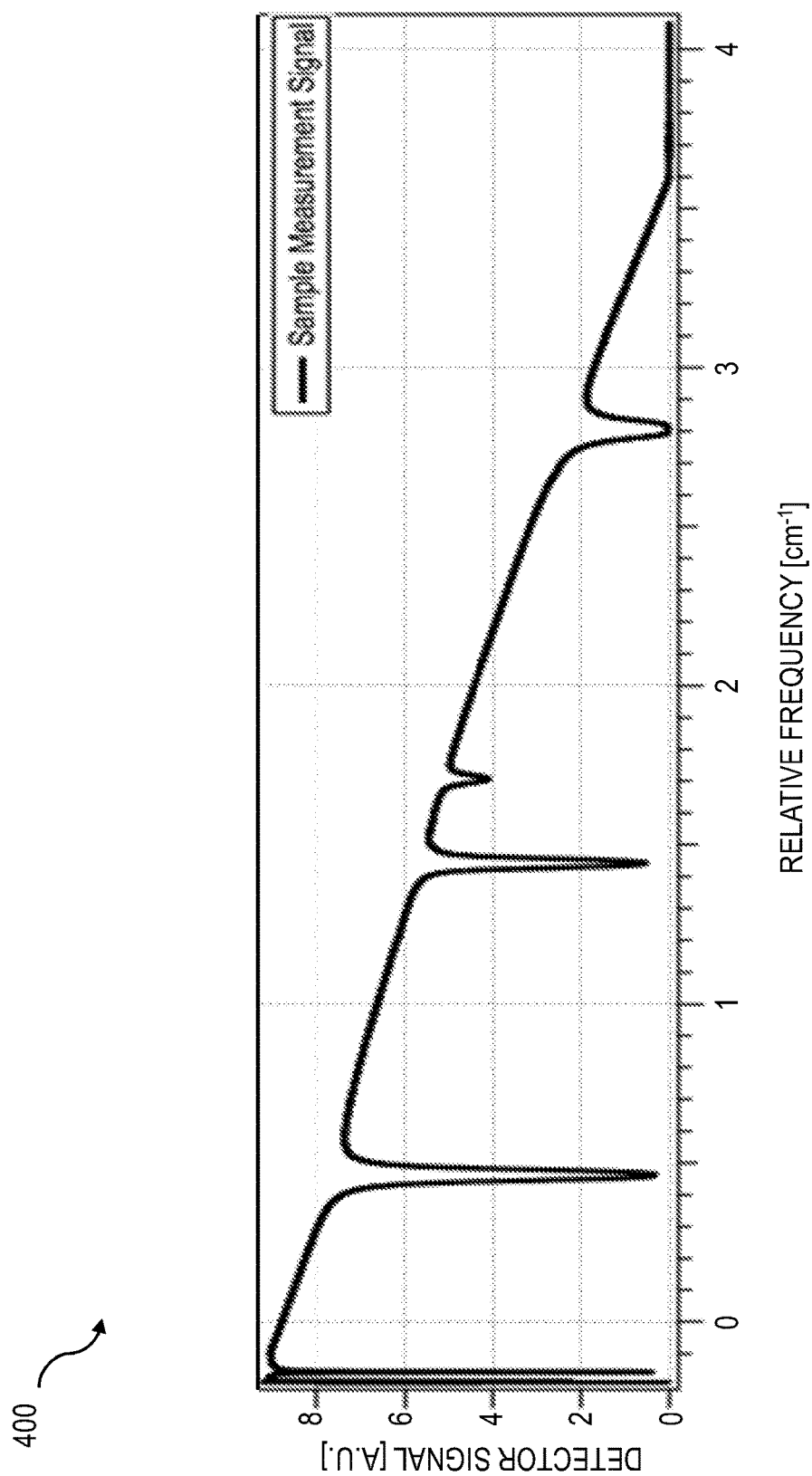
FIG. 4 shows a chart illustrating the sample measurement signal of FIG. 2 measured in a time domain converted into a frequency domain.

FIG. 2, FIG. 3, and FIG. 4 show charts 200, 300, 400 illustrating an example of a sample measurement signal and frequency response of a DAS system. The chart 200 of FIG. 2 shows a sample measurement signal (e.g. a field spectrum) generated by at least part of a beam from a light source passing through a field sample and being captured by a detector (e.g. a first detector 112 as described above in relation to FIG. 1). As noted above, at least part of the beam is directed through a wavelength/frequency calibrator 116 and captured by either the same detector or a second detector 120 to generate a frequency calibration signal. Any two adjacent transmission peaks (or valleys) in the frequency calibration signal represent a constant optical frequency change resultant from e.g. scanning the laser injection current. This constant optical wavelength/frequency change can be determined based on the free spectral range (FSR) of the wavelength/frequency calibrator.

The chart 300 of FIG. 3 shows an example of this wavelength/frequency calibration signal processed to identify the wavelength/frequency response of the system versus time, and then to generate a conversion function from a time domain to frequency domain f(t) (or to wavelength domain). The conversion function can be generated by mapping the relative optical wavelength/frequency change as a function of time (position along a current ramp) for each transmission peak in the wavelength/frequency calibration signal in chart 200, and fitting the resultant discrete samples using a mathematical expression (the conversion function). The chart 400 of FIG. 4 shows an example of the sample measurement signal measured in a time domain (e.g. the data shown in FIG. 2) converted into a wavelength/frequency domain using the conversion function f(t).

Figure 5:
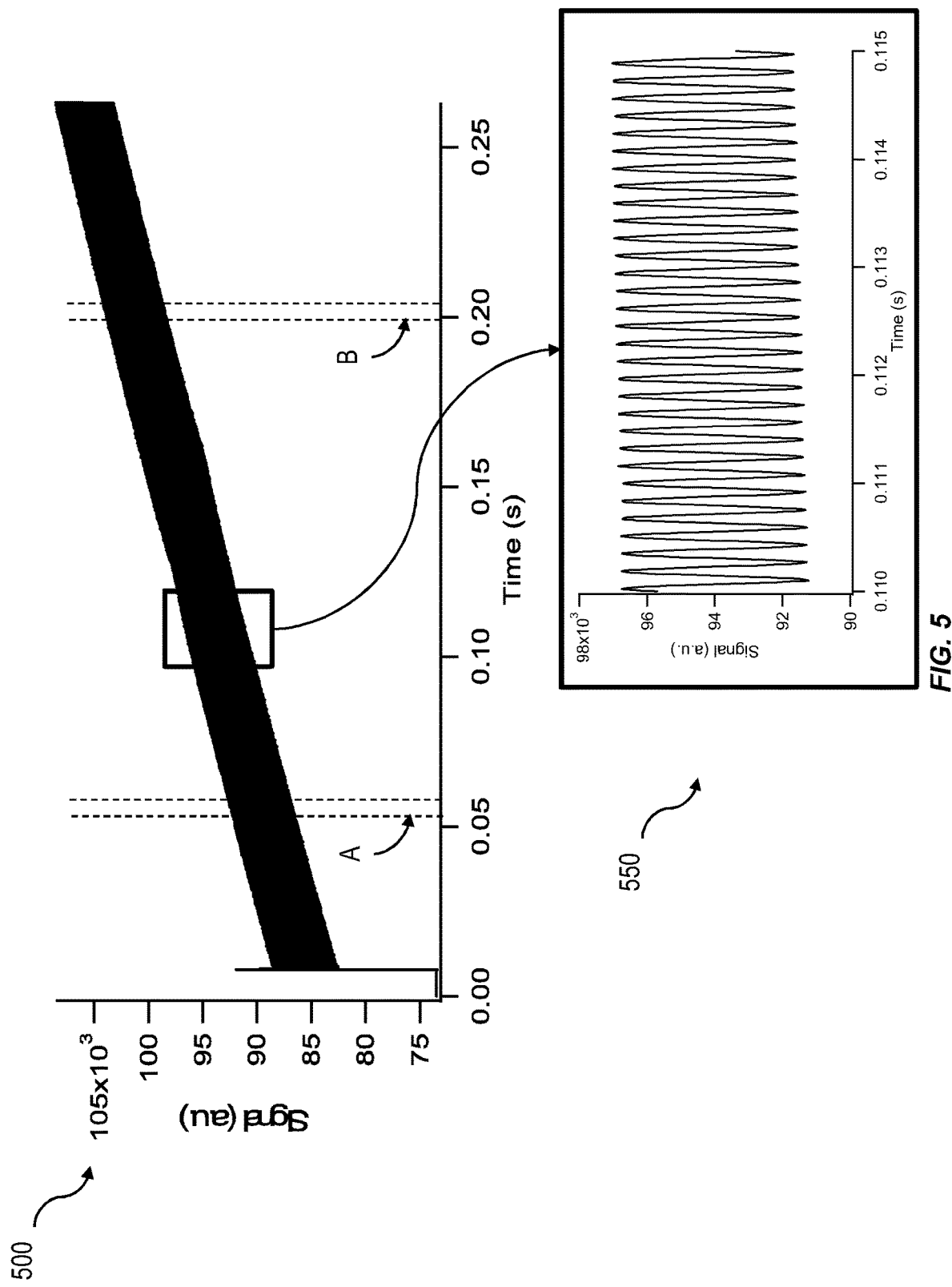
FIG. 5 shows a chart illustrating an example of a sample measurement signal generated by a WMS system.
Figure 6:
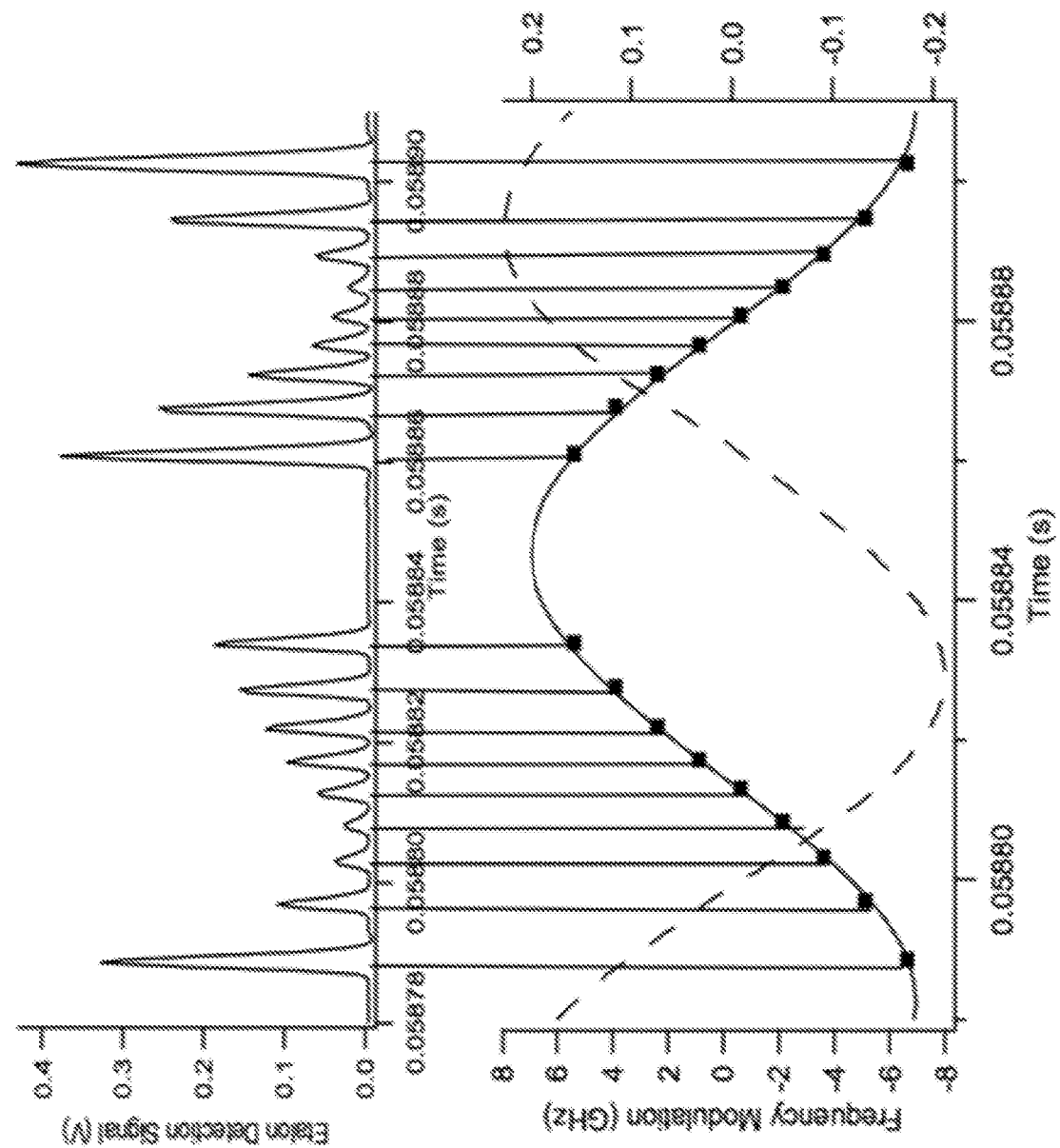
FIG. 6 shows charts respectively illustrating frequency calibration signal data generated by a detector after light from a light source has passed through a wavelength/frequency calibrator and a frequency calibration signal processed to identify the frequency response of the system versus time for an early part of an injection current ramp.
Figure 7:
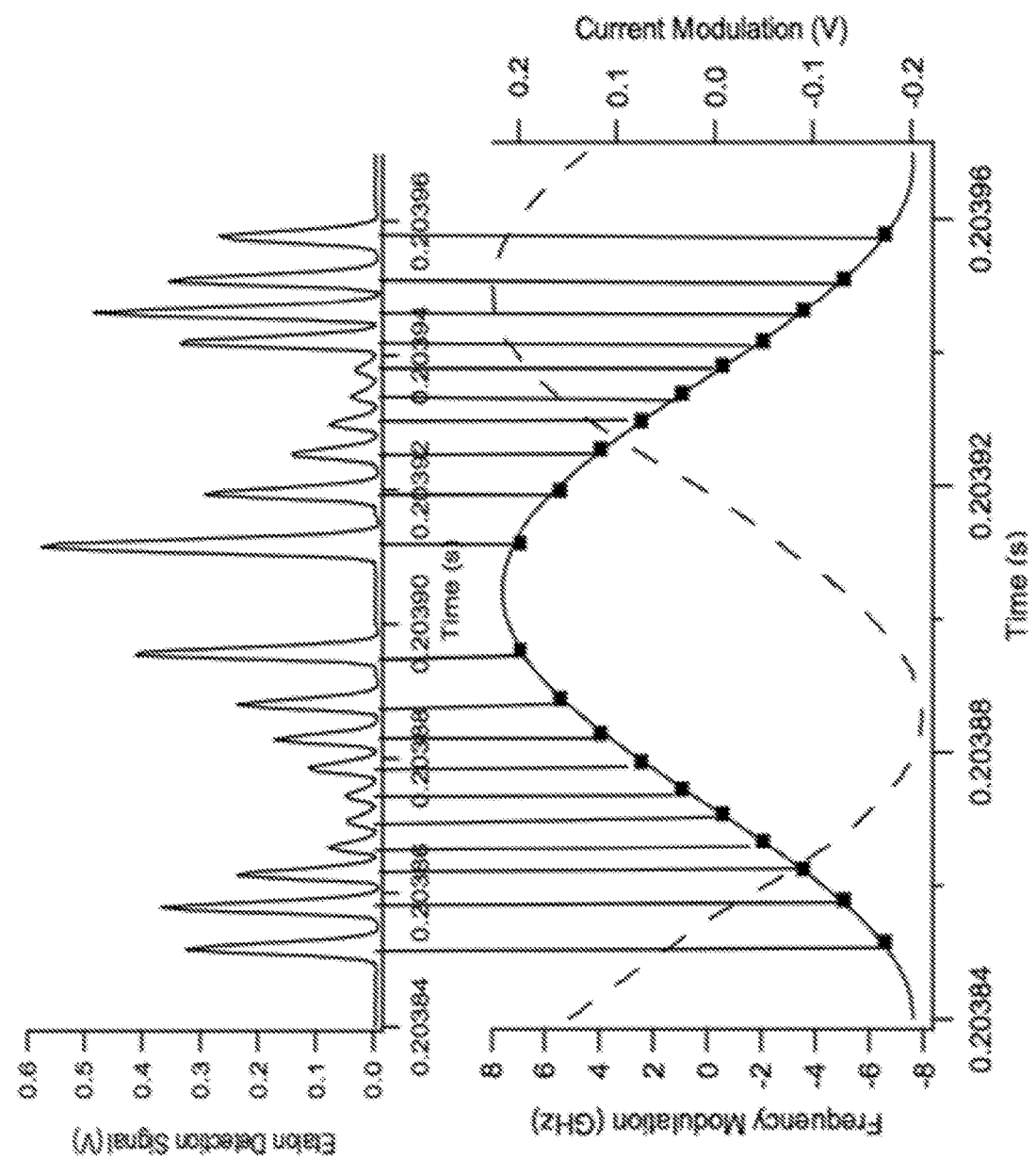
FIG. 7 shows charts respectively illustrating frequency calibration signal data generated by a detector after light from a light source has passed through a wavelength/frequency calibrator and a frequency calibration signal processed to identify the frequency response of the system versus time for a later part of an injection current ramp.

FIG. 5, FIG. 6, and FIG. 7 show charts 500, 550, 600, 650, 700, 750 illustrating the wavelength/frequency response of an example WMS system. The driving current of a light source (e.g. a light source 102 as described above in relation to FIG. 1) is changed by, for example, a low frequency (e.g. at Hz) linear ramp, $i_0 t$ with a high frequency (e.g. at kHz) sinusoidal modulation signal superimposed on this linear ramp signal, which can be expressed as follows:

$$i(t) = i_0 t + i_1 \sin(\omega t) \quad (1)$$

where i is the instantaneous driving current of the light source, $i_0$ is the linear ramp amplitude, $i_1$ is the sinusoidal amplitude, and $\omega$ is the angular frequency. Accordingly, the instantaneous laser frequency v(t) can be described as follows:

$$v(t) = v_0 f(t) + v_1 \sin(\omega t + \phi_1) + \sum_{k=2}^{\infty} v_k \sin(k\omega t + \phi_k) \quad (2)$$

where $v_0 f(t)$ is the instantaneous laser frequency response to the linear current ramp $i_0 t$, which is either linear or nonlinear. The subsequent sinusoidal terms are the frequency modulation (FM) responding to the sinusoidal current modulation.

The chart 500 of FIG. 5 shows an example of a sample measurement signal captured by a first detector 110, which corresponds to the first portion of the beam 104 (as described above in reference to FIG. 1) that has passed through the measurement volume 110 containing the sample fluid. This signal has both a ramp (as illustrated by the envelope) and a sinusoidal modulation (as illustrated by the inset graph 550) responding to the current linear ramp and sinusoidal modulation, respectively. It will be understood that the sample measurement signal can also be generated using other versions of a spectroscopic analysis system such as those optional variations discussed above.

The top panels 600, 700 of FIG. 6 and FIG. 7 each show an enlarged view of a frequency calibration signal generated by the second detector 120. As discussed above, these signals are obtained by passing the second portion of the beam 114 through the wavelength/frequency calibrator 116 (e.g. a FP interferometer). The signal plotted in the chart 600 of FIG. 6 is taken for one sinusoidal period near the beginning of the ramp, whereas the signal plotted in the chart 700 of FIG. 7 is taken for another sinusoidal period nearer the end of the ramp.

The bottom panels 650, 750 of FIG. 6 and FIG. 7 each show the respective frequency calibration signal processed to identify frequency registration deviations of the spectroscopic analysis system versus time, which includes the information about the FM profile (whether it only contains the first harmonic, or whether the higher harmonics are non-negligible), the FM amplitude vk, and the FM phase delay $\Phi_k$ from the current modulation sine signal. The dashed lines are the input current modulation, and the solid lines are the FM response. In this example, the FM is linear, and therefore only contains the first harmonic. The phase delay $\Phi_1$ between the FM and current modulation in the chart 650 of FIG. 6 is 110 degrees, and the FM magnitude $v_1$ is 4.79 GHz. The phase delay $\Phi_1$ in the chart 750 of FIG. 7 is 92 degrees and the magnitude $v_1$ is 4.91 GHz, which both differ from the corresponding values in the chart 650 of FIG. 6. In other words, the phase delay and FM magnitude differ between the early part of the ramp and the later part of the ramp.

Correction of wavelength/frequency registration deviation occurring in a spectroscopic analysis system can, consistent with implementations of the current subject matter, include measuring and quantifying how the wavelength/frequency response changes with time within a repetitive frequency scanning period. Alternatively, changes in the wavelength/frequency response can be characterized and quantified with another variable that is referenced, indexed, correlated, etc. to time within the scan range. Examples of such other variables can include light source operating current, light source operating temperature, filter operating parameters (such as grating angle or position, filter rotation angle, temperature of thermal-optical filters, or the like), etc. In a relatively mathematically simple implementation, such as in DAS as illustrated in FIG. 2 through FIG. 4, the light frequency can be characterized and/or modeled as one or more functions of time (or another of the variables listed above). The term f(t) can be expressed in an analytical form (e.g. a linear or nonlinear function), a numerical form (e.g. an array, a matrix, a look up table, etc.), or some combination of the two.

In more complicated implementations, such as for a WMS system configured to produce outputs similar to those shown in FIG. 5, FIG. 6, and FIG. 7, not only the frequency scan v0f(t) due to the current ramp, but also the FM profile, FM amplitude $v_k$, and FM phase delay $\Phi_k$ due to the sinusoidal current modulation at one or more time spots on the wavelength/frequency scan can be measured and recorded.

Implementations of the current subject matter can include either or both of at least two approaches to reconstructing a frequency registration of a spectroscopic system to correct for frequency registration deviations and thereby conform the spectroscopic analysis system to a previously characterized calibration state. A first approach, which can be characterized as a "passive" correction to a wavelength/frequency registration deviation, can include one or more operations similar to those summarized below in reference to the process flow chart 800 of FIG. 8. At 810, a frequency registration deviation of a spectroscopic analysis system is characterized. The characterizing includes recording a field calibration spectrum indicative of one or more changes of a light source of the spectroscopic analysis system relative to a calibrated state of the spectroscopic analysis system. The field calibration spectrum can be recorded by passing light emitted by the light source of the spectroscopic analysis system through a calibrator, which can be a wavelength/frequency calibrator 116 as discussed above in reference to FIG. 1, and on to a detector to record the field calibration spectrum.

Based on the characterized frequency registration deviation of the field calibration spectrum, at 820 a conversion function is derived. The conversion function includes at least one mathematical operation that reduces the frequency registration deviation present in the field calibration spectrum relative to a calibration state of the spectroscopic analysis system. As discussed above, the mathematical operation(s) of the conversion function, when applied to the time (or current or other correlated variable) axis of a field spectrum, can in some example implementations result in the field spectrum being converted from a time-correlated axis to a true frequency axis. Unlike conventional approaches that generally assume a constant and linear relationship between time along a scan (or, alternatively between applied driving current, temperature, etc.) and the emitted frequency from the light source, the known and well-characterized frequency response of the calibrator 116 can be used as "guideposts" to provide a linear frequency scale to which a field spectrum can be converted using the conversion function.

In other implementations of the current subject matter, the conversion function need not convert the field spectrum recorded for a field sample to a linear frequency scale but can instead involve one or more mathematical operations that alter the shape of the field spectrum such that it matches a shape that would have occurred were the field spectrum acquired with the spectroscopic analysis system in its calibration state according to some arbitrary (e.g. not necessarily linear or constant) frequency scale. In other words, while some approaches consistent with the current subject matter involve determining what mathematical operations are required to linearize a reference axis (e.g. from time, applied driving current, temperature, etc.) of an absorbance spectrum to enable a comparison to a calibration state of the spectroscopic analysis system, it is also within the scope of the current subject matter to simply adjust the field spectrum to a same frequency scale (having arbitrary but known characteristics and not necessarily being linear) as that used in characterizing the calibration state of the spectroscopic analysis system. Using this approach, field spectra obtained using the spectroscopic analysis system are uniformly converted to a known, well-characterized frequency scale such that absorbance features are correctly registered to a same frequency as in the calibration state of the spectroscopic analysis system.

At 830, a field spectrum recorded by the spectroscopic analysis system for a field sample is converted by applying the conversion function to the field spectrum to produce converted field spectral data comprising spectral data registered to corrected frequency responses of the spectroscopic analysis system, for example as a result of the conversion function producing a converted field spectrum in which intensity data recorded by a detector of the spectroscopic analysis system are correctly correlated with the actual frequency response of the spectroscopic analysis system. As discussed above, this can involve a linearization of the wavelength/frequency axis or registration of spectral response in the field spectrum to some arbitrary (optionally non-linear or non-constant) but known and well-characterized scale. The field spectrum is measured by passing at least part of the beam of light emitted from the light source of the spectroscopic analysis system through a field sample that includes a sample fluid and on to a detector, which can be the same detector as that used in recording the field calibration spectrum or a different detector.

One or more of a pressure of the field sample, a temperature of the field sample, and a concentration of one or more analytes in the field sample is then calculated at 840 using the converted field spectrum, for example by applying calibration data using direct absorption spectroscopy and/or wavelength modulation spectroscopy techniques an/or a peak fitting approach as discussed above. For example, one or more peak heights, peak widths, area under a peak, or the like may be quantified and used at least in part (e.g., with calibration data) to determine a concentration of one or more analytes in a field sample and/or to make one or more other spectroscopic measurements and/or to determine temperature and/or pressure of the field sample. Any of many available approaches for determining target analyte concentrations from a field spectrum are applicable with the current subject matter. The pressure and temperature of the sample fluid of the field sample can be determined as discussed above.

As noted above, conversion of the field spectrum to converted field spectral data can include transforming the field spectral data from a time domain into an optical wavelength/frequency domain. In other words, spectral responses detected by a detector of the spectroscopic analysis system can be accurately registered to an actual wavelength/frequency response of the spectroscopic analysis system instead of to a proxy for the actual wavelength/frequency response (e.g. time within a scanning period, injection current to a laser, etc.), which in previously available approaches was generally assumed to linearly map to the actual wavelength/frequency response and/or remain temporally unchanged with respect to calibration of the spectroscopic instrument. In this manner, a virtual reconstruction of a wavelength/frequency registration of the spectroscopic analysis system is created that is consistent with a calibration state of the spectroscopic analysis system. The field calibration spectrum can be converted into the wavelength/frequency domain based on a field wavelength/frequency registration calibration of the system $v_{cal}(t)$, which is determined from the spectral signal generated by passing the light source beam (or at least part of the beam) through the wavelength/frequency calibrator 116 on to a detector (e.g. the second detector of FIG. 1). Similarly, the measured field spectrum is also converted into the frequency domain $v_{field}(t)$ based on the field wavelength/frequency registration calibration of the system $v_{cal}(t)$. As noted above, the measured field spectrum can alternatively be converted into a wavelength domain. As discussed above, the frequency domain $v_{field}(t)$ and/or the wavelength domain can (but need not necessarily) be linear over some or all of the scanned range of wavelengths/frequencies in the field calibration spectrum and the field spectrum.

The charts 200, 300, 400 of FIG. 2 through FIG. 4 illustrate one example of such an approach. In particular, the chart 400 of FIG. 4 shows a plotting of the signal from a first detector (e.g. a field spectrum reflecting light intensity after at least part of the beam passes through the sample fluid) against a relative wavelength/frequency, which is derived from the transposition of the field spectrum and field calibration spectrum from the time domain to the wavelength/frequency domain using a conversion function f(t) identified from the data of FIG. 3. In the example of FIG. 3, f(t) is a third order polynomial function used to fit the etalon peak structure observed in the signal generated by the detector receiving the portion of the light source beam passing through the wavelength/frequency calibrator 116. However, it will be well understood that any form of the conversion function is within the scope of the current subject matter. This approach can also be applied to a calibration-free implementation of a spectroscopy analysis system. Conversion of the spectral response in the field spectrum of the sample fluid to the frequency domain/wavelength domain can enable compensation for spectral registration deviations during a scan and from scan to scan over time.

A further extension of the approach discussed above can include operations similar to those summarized below in reference to the process flow chart 900 of FIG. 9, which can be used in conjunction with one or more control subsystems (which can be implemented in software and/or hardware, and which can be digital, analog, or a combination of both) of the spectroscopic analysis system to actively modify wavelength/frequency response of a spectroscopic analysis system such that the frequency response conforms to pre-determined laser frequency scan response of the spectroscopic analysis system. As described above in reference to FIG. 8, the wavelength/frequency registration of the spectroscopic analysis system $v_{field}(t)$ can be monitored, for example in real time (or some approximation thereof, such as in near-real time, semi-continuously, intermittently on some regular or irregular period, etc.) though recording of one or more field calibration spectra. As discussed above, the monitoring of the wavelength/frequency registration of the spectroscopic analysis system can advantageously occur at least approximately concurrently with recording of field spectra by the spectroscopic analysis system. In some implementations consistent with FIG. 9, a real item or near real time concurrent measurement of wavelength/frequency registration deviation can be used by the spectroscopic analysis system as part of a feedback control loop to dynamically modify one or more operating parameters of the spectroscopic analysis system such that detected wavelength/frequency deviations from a pre-determined laser wavelength/frequency scan response (which can include either a linear wavelength/frequency scale, a partial linear scale, or a fully non-linear frequency scale) can be corrected during a scan. As noted before, the pre-determined laser wavelength/frequency scan response can optionally be a laser wavelength/frequency scan response that the laser had during a calibration state of the spectroscopic analysis system, or it can be some arbitrary other pre-determined laser wavelength/frequency scan response to which spectra obtained during the calibration state were converted as per an approach similar to that described in reference to FIG. 8. Approaches consistent with its implementation can be referred to as "active" wavelength/frequency correction approaches.

Figure 8:
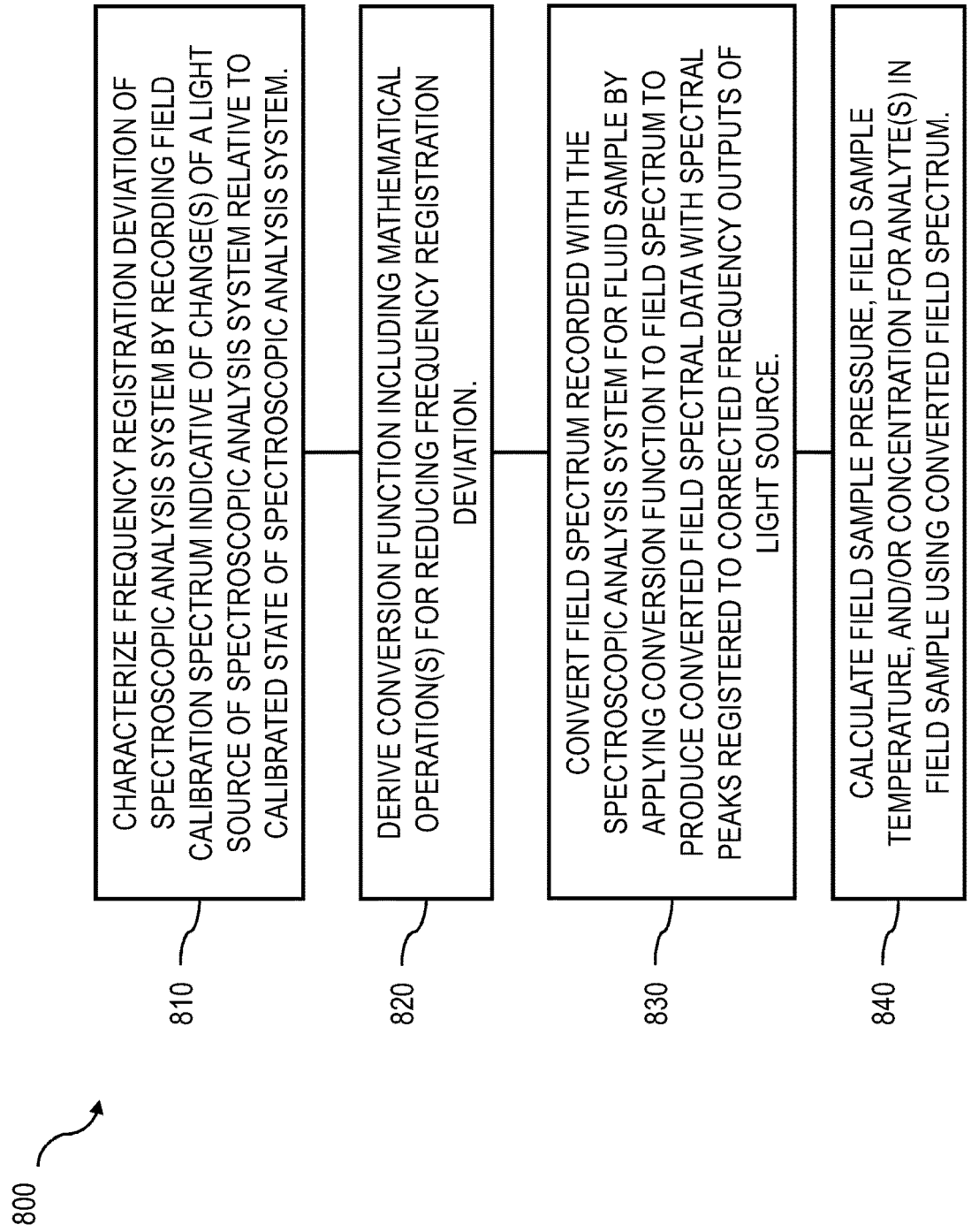
FIG. 8 shows a process flow diagram illustrating method features consistent with implementations of the current subject matter.
Figure 9:
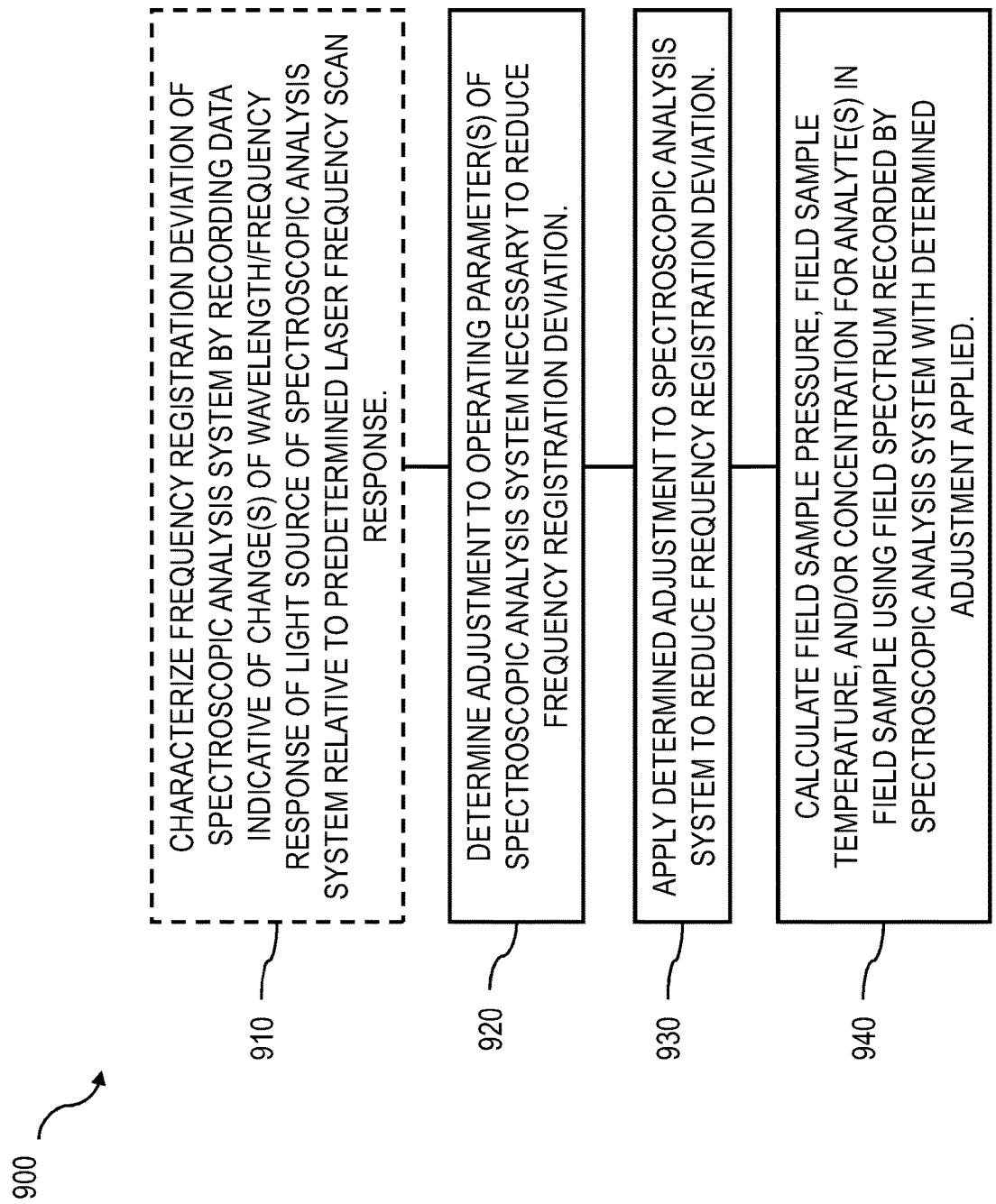
FIG. 9 shows a process flow diagram illustrating additional method features consistent with implementations of the current subject matter.

At 910, a wavelength/frequency registration deviation of the spectroscopic analysis system can optionally be characterized, for example by recording data indicative of one or more changes of a light source of the spectroscopic analysis system relative to a predetermined laser wavelength/frequency scan response of the spectroscopic analysis system (e.g. as at 810 of FIG. 8). In some examples, the data indicative of the one or more changes of the light source can include at least part of a field calibration spectrum recorded by passing light emitted by the light source of the spectroscopic analysis system through a calibrator, which can be a wavelength/frequency calibrator 116 as discussed above in reference to FIG. 1, and on to a detector to record the field calibration spectrum.

At 920, an adjustment to at least one operating parameter of the spectroscopic analysis system is determined. The adjustment can, in some implementations of the current subject matter, be determined by consideration of the current state of various parameters of the spectroscopic analysis system. In other words, no direct measurements of a wavelength/frequency registration deviation are required. Instead, values of the one or more operating parameters of the spectroscopic analysis system are analyzed relative to a characterized set of such parameters to determine target values for the one or more operating parameters necessary to bring the spectroscopic analysis system into closer registration with a calibration state. Because the wavelength/frequency of light emitted by a semiconductor laser is a function of the instantaneous temperature in the quantum well of the laser, data characterizing the effect of various operating parameters of the spectroscopic analysis system (e.g. one or more of the operating parameters described below) on this temperature can be used to determine how one or more of the operating parameters can be adjusted to bring the quantum well temperature to a value that will produce the wavelength/frequency of light from the laser that matches (e.g. is properly registered with) the wavelength/frequency of light at a given part of the laser scan range for the calibration state of the spectroscopic analysis system.

Alternatively or in addition, the adjustment at 920 can be based on the characterized wavelength/frequency registration deviation (e.g. using the data indicative of one or more changes of a light source of the spectroscopic analysis system relative to a predetermined laser wavelength/frequency scan response of the spectroscopic analysis system as obtained at 910), for example by using the characterized wavelength/frequency to determine how or whether the current wavelength/frequency response of the spectroscopic analysis needs to be changed to bring it into closer agreement with that of the spectroscopic analysis system at the time that the spectroscopic analysis system was in a calibrated state. In other words, in some optional implementations of the current subject matter, the data indicative of the one or more changes of the light source can be used in the determination of an adjustment to the one or more operating parameters of the spectroscopic analysis system to cause it to conform to the pre-determined laser frequency scan response (e.g. that of the spectroscopic analysis system in the calibration state).

It is also within the scope of the current subject matter to use the data indicative of one or more wavelength/frequency changes of the light source of the spectroscopic analysis system relative to the predetermined laser wavelength/frequency scan response of the spectroscopic analysis system obtained at 910 in addition to pre-stored relationships or profiles characterizing known responses of the light source to one or more operating parameters. For example, various operating parameters can be monitored for the spectroscopic analysis system to determine whether an adjustment is needed based on known and stored profiles for the light source and spectroscopic analysis system. As a check on the adjustments determined in this manner, data indicative of one or more wavelength/frequency changes of the light source of the spectroscopic analysis system relative to the predetermined laser wavelength/frequency scan response of the spectroscopic analysis system can be recorded and optionally used to determine one or more additional adjustments to further reduce the spectroscopic analysis system frequency registration deviation and/or verify that the adjustments are resulting in a desirably accurate scan.

The determining of which operating parameters of the spectroscopic analysis system to adjust at 920 can include one or more multivariate optimization and/or regression algorithms including but not limited to a Newton method, a quasi-Newton method, a conjugate gradient method, an interior point method, a gradient descent method, an ellipsoid method, a reduced gradient method, a pattern search method, a heuristic based method (e.g. a genetic algorithm, a simulated annealing method, an evolutionary algorithm, a memetic algorithm, a dynamic relaxation, etc.), an artificial intelligence based method, a classical least square regression (CLS), an inverse least square regression (ILS), a principal component analysis (PCA), a component regression (PCR), a partial least square regression (PLS), a multiple linear regression (MLR), and the like.

The adjustment determined at 920 can be implemented at 930 as part of a control loop that applies the adjustment to at least one operating parameter of the spectroscopic analysis system necessary to reduce the wavelength/frequency registration deviation. The applying occurs during a scan (e.g. a wavelength/frequency scan) of the spectroscopic analysis system to reduce the wavelength/frequency registration deviation of the spectroscopic analysis system relative to the predetermined laser wavelength/frequency scan response of the spectroscopic analysis system.

In one example, the adjustment can be applied to de-linearize the current ramp provided to the light source to drive the wavelength/frequency change across the desired scan range in a linear manner (e.g. to correct for non-linearities between the current ramp and the resulting wavelength/frequency of the light source). In effect, the scan of the light source is then converted to be linear (or more closely linear) in terms of wavelength/frequency or to otherwise provide wavelength/frequency response that is more consistent with a predetermined state, which need not be linear. In some examples, the predetermined state can conform to the calibration state of the spectroscopic analysis system. As in other parts of this disclosure, description of adjustments to make the scan linear in wavelength/frequency can similarly apply to an adjustment that cause a change in the wavelength/frequency registration deviation relative to any arbitrary state of calibration of the spectroscopic analysis system (which can, for example, be non-linear, piecemeal linear, combinations of such characteristics, or the like).

The determined adjustment is applied to the spectroscopic analysis system at 930, for example by a control unit of the spectroscopic analysis system (e.g. a controller 130 as in FIG. 1) that implements the aforementioned control loop to change the at least one operating parameter of the spectroscopic analysis system according to the determined adjustment. A field spectrum can be recorded at 940 by the application of the determined adjustment, and one or more of a pressure of the field sample, a temperature of the field sample, and a concentration for one or more analytes in the field sample can be calculated using the using the field spectrum recorded by the spectroscopic analysis system with the adjustment applied, for example by applying calibration data using direct absorption spectroscopy and/or wavelength modulation spectroscopy techniques. For example, one or more peak heights, peak widths, area under a peak, or the like may be quantified and used at least in part (e.g., with calibration data) to determine a concentration of one or more analytes in a field sample and/or to make one or more other spectroscopic measurements and/or to determine temperature and/or pressure of the sample fluid based on the field spectrum recorded by the spectroscopic analysis system with the determined adjustment applied. The concentration and/or pressure and/or temperature analysis can proceed as discussed above.

It will be understood that the applying of the determined adjustment at 930 can be done from one full scan to a next scan or while a scan is in progress. For example, data indicative of the one or more changes of the light source of the spectroscopic analysis system relative to the predetermined laser wavelength/frequency scan response can be collected over a scan that is independent of a scan used to collect a field spectrum or during a same scan (e.g. by using a beam splitter, by detecting light emitted form at least one second reflector of the laser light source and/or a back facet of the laser light source and/or by high reflector leakage, etc.). The scan for the field spectrum and the scan for collecting the data indicative of the one or more changes of the light source of the spectroscopic analysis system relative to the predetermined laser wavelength/frequency scan response can be alternated (e.g. one of each in sequence), caused to occur periodically (e.g. at some time interval or after a certain number of field spectra, a scan is completed to collect the data indicative of the one or more changes of the light source of the spectroscopic analysis system relative to the predetermined laser wavelength/frequency scan response), in response to some measured or detected condition, etc. For example, in some implementations of the current subject matter, one or more triggers for running a field calibration spectrum can be used. These triggers can include one or more of detection of a preset amount of wavelength/frequency registration deviation, a number of scans completed since a last field calibration spectrum was obtained, an amount of time elapsed since a last field calibration spectrum was obtained, or the like.

Operating parameters that can be adjusted can include light source operating current and/or temperature parameters, optical filter operating parameters, detector operating parameters, and the like. The light source operating current and/or temperature parameters can include the center operating value, the light source temperature, the scan amplitude, the scan frequency, the scan profile (linear or nonlinear), the modulation profile, the modulation amplitude, the modulation phase delay, a nominal current value, a current ramp rate, a laser modulation current, a modulation frequency, a phase shift applied to at least one section of the light source, an effective index of refraction change applied to at least one section of the light source, etc. The optical filter operating parameters can include grating angle or position, effective grating period, filter rotation angle, temperature of thermal-optical filters, effective refractive index of etalon like structures and/or laser resonator sections, etc. The detection operating parameters include the lock-in amplifier detection phase, a detection gain, etc.

For example, a DAS system with driving current $i(t)=i_0 t$ can have a linear frequency response $v(t)=v_0 t$ in its calibrated state. However, over time with degradation of the hardware of the spectroscopic analysis system, the field frequency registration can begin to show nonlinearity. This nonlinear response can be modeled with a nonlinear function of time $v(t)=v_0 f(t)$ or current $v(t)=v_0 g(i(t))$. Consistent with some implementations of the current subject matter, the driving current of the light source (and/or other parameters as summarized above) can be adjusted to change nonlinearly, e.g. as the inverse function of $f(t)$ or $g(i)$, such that the spectroscopic analysis system is restored to a linear frequency response.

The adjustment of the at least one operating parameter of the spectroscopic analysis system to reduce the characterized wavelength/frequency registration deviation can be applied to an entire frequency scan, or to one or more sections of the scan. One or more individual sections of a scan can optionally include different adjustments to the spectroscopic analysis system operating parameters such that wavelength/frequency registration deviations are reduced to reproduce a linear frequency scan.

Further advantages that can be realized with implementations of the current subject matter can include real time measurement state correction that allows for a more robust system. Such measurement state corrections can reduce or eliminate susceptibility to hardware degradation, drift and/or non-reproducibility, thereby assisting in maintaining the accuracy and fidelity of the quantitative measurements. System lifetime of instruments in the field can also be increased, and customer returns reduced.

In another option discussed above, the wavelength/frequency registration deviation need not be measured as part of the process of conforming the wavelength/frequency response of the spectroscopic analysis system to a predetermined laser wavelength/frequency scan response of the spectroscopic analysis system. Instead, a laser light source can be pre-characterized to determine and store an injection current (also referred to as a drive current) profile that provides a scan with a known, arbitrary wavelength/frequency axis, which can match a state of calibration, or a wavelength/frequency linear spectral scan, as a function of an operating temperature of a temperature control device associated with the laser (e.g. as could be represented by a temperature setting of a thermoelectric cooler or other device in thermal contact with the laser), a ramp current (Iramp), a modulation current, (Imod), a ramp span (e.g. over a certain wavelength/frequency range), etc. These profiles, which amount to a known set of parameters of the spectroscopic analysis system that result in a linear (or otherwise known but not necessarily linear over the whole range) wavelength/frequency response, can be stored in a matrix, such as for example in an erasable programmable read-only memory (EPROM). A wavelength/frequency calibrator, as mentioned elsewhere in this application, for example a SWIFTS wavemeter (e.g. the LW-10 available from Resolution Spectra Systems) or a quadrature wavemeter, or the like can be employed to record the operating parameter matrix required to reproduce either the scan frequency profile of the spectroscopic analysis system and/or it light source, at a time of calibration, or with a linear wavelength/frequency axis. By accessing the EPROM, the spectroscopic analysis system can make changes to and actuate the operating parameters of the light source and/or the spectroscopic system in real time such that the wavelength/frequency response matches a desired, well-characterized state of the spectroscopic analysis system. Furthermore, in operation, a wavemeter can be used for measuring the wavelength/frequency of the light source and measuring (or detecting) one or more operating parameters and modifying one or more other operating parameters of the spectroscopic analysis system such that a predetermined laser wavelength/frequency scan response occurs for the current scan, in at least approximately real time. For example, the various operating parameters can be quantified with regard to their influence on the temperature in the laser quantum well of a semiconductor laser. It is this quantum well temperature that ultimately determines the instantaneous laser wavelength/frequency. With a well-characterized matrix of scan profiles and/or real time measurements of the laser wavelength/frequency incorporated in a feedback loop actuating at least one laser operating parameter, predictions can be made and necessary adjustments implemented (either at the start of a scan or during a scan) to ensure that the predetermined laser wavelength/frequency scan response occurs.

One or more aspects or features of the subject matter described herein can be realized in digital electronic circuitry, integrated circuitry, specially designed application specific integrated circuits (ASICs), field programmable gate arrays (FPGAs) computer hardware, firmware, software, analog electronic circuitry and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to as programs, software, software applications, applications, components, or codes, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor or a free space optical display (2D or 3D) for displaying information to the user and a keyboard and a pointing device, such as for example a mouse or a trackball or a trackpad, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, gesture recognition or detection devices, and the like. A computer remote from an analyzer can be linked to the analyzer over a wired or wireless network to enable data exchange between the analyzer and the remote computer (e.g. receiving data at the remote computer from the analyzer and transmitting information such as calibration data, operating parameters, software upgrades or updates, and the like) as well as remote control, diagnostics, etc. of the analyzer.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   providing a tunable diode laser absorption spectroscopic analysis system comprising:
   a frequency-scannable laser light source configured to emit light over a desired range of frequencies;
   a measurement volume containing a sample fluid and arranged such that light from the light source selectively passes through the measurement volume;
   a detector configured to receive the light from the light source and to quantify the received light; and
   a wavelength/frequency calibrator arranged such that light from the light source selectively passes therethrough and configured to generate individually resolvable frequency markers, which define a frequency scale within the range of frequencies when the light from the light source passes therethrough;

characterizing a current frequency registration deviation of the spectroscopic analysis system, the characterizing comprising recording a field calibration spectrum, which is generated by passing the light from the light source through the wavelength/frequency calibrator to the detector, wherein the field calibration spectrum is indicative of one or more changes of the light source relative to a stored calibrated state of the spectroscopic analysis system;

deriving a conversion function comprising at least one mathematical operation that reduces the current frequency registration deviation relative to the stored calibrated state, wherein the conversion function comprises a fitted mathematical expression to model a relative frequency difference between spectral features present in the field calibration spectrum and the frequency markers provided by the wavelength/frequency calibrator such that the characterized current frequency registration deviation is consistent with a stored calibrated frequency registration deviation of the spectroscopic analysis system characterized when the spectroscopic analysis system was in the stored calibrated state, wherein the spectral features present in the field calibration spectrum include peaks and/or valleys of one or more of an intensity change, a frequency modulation amplitude, a frequency modulation profile and a frequency modulation phase delay resulting from interaction of the emitted light from the light source with the wavelength/frequency calibrator, as provided by the field calibration spectrum, relative to one or more of an intensity change, frequency modulation amplitude, a frequency modulation profile and a frequency modulation phase delay, respectively, resulting from interaction of light from the light source with the wavelength/frequency calibrator in the stored calibrated state;

converting a field spectrum recorded with the spectroscopic analysis system for a field sample comprising the sample fluid, the field spectrum generated by passing the light from the light source through the measurement volume, wherein the converting comprises applying the conversion function to the field spectrum to produce converted field spectral data comprising spectral data registered to a corrected frequency response of the spectroscopic analysis system, wherein the field spectrum is converted to the frequency scale provided by the wavelength/frequency calibrator such that spectral features of the field spectrum are correctly registered to a same frequency as in the stored calibrated state; and calculating one or more of a pressure of the field sample, a temperature of the field sample, and a concentration for one or more analytes in the field sample using the converted field spectral data.

2. A method as in claim 1, wherein the at least one mathematical operation of the conversion function converts the field spectrum to be linear with regard to frequency.

3. A method as in claim 1, wherein the wavelength/frequency calibrator comprises at least one of an optical wavemeter, an optical interferometer, an etalon, and an optical resonator.

4. A method as in claim 1, wherein the wavelength/frequency calibrator comprises an optical interferometer and further comprises at least one of a phase-locked-loop and a frequency synthesizer for interpolating interference fringes and increasing a frequency resolution of the interferometer.

5. A method as in claim 1, further comprising recording the field spectrum at least approximately concurrently with the field calibration spectrum.

6. A method as in claim 5, wherein the recording of the field spectrum at least approximately concurrently with the field calibration spectrum comprises simultaneously recording the field spectrum and the field calibration spectrum.

7. A method as in claim 6, wherein the spectroscopic analysis system comprises a beam splitter, the beam splitter directing a first portion of a beam emitted by the light source such that the first portion passes through the sample fluid and on to a first detector for characterizing intensity changes resulting from interaction of the first portion with the sample fluid, which are recorded in the field spectrum, the beam splitter further directing a second portion of the beam such that the second portion passes through the wavelength/frequency calibrator and on to a second detector for characterizing intensity changes resulting from interaction of the second portion with the wavelength/frequency calibrator.

8. A method as in claim 6, wherein the spectroscopic analysis system is configured to direct at least a first portion of a beam emitted by the light source such that the first portion passes through the sample fluid and on to a first detector for characterizing intensity changes resulting from interaction of the first portion with the sample fluid, which are recorded in the field spectrum, and wherein the spectroscopic analysis system comprises the wavelength/frequency calibrator positioned to receive light emitted from at least one second reflector of a light source and/or a back facet of the light source and/or by high reflector leakage from the light source, the spectroscopic analysis system further comprising a second detector for characterizing intensity changes resulting from interaction of the light with the wavelength/frequency calibrator.

9. A method as in claim 5, wherein the recording of the field spectrum at least approximately concurrently with the field calibration spectrum comprises alternately recording the field spectrum and the field calibration spectrum and/or recording the field calibration spectrum at preset intervals and/or when triggered by a preset frequency registration deviation.

10. A method as in claim 9, wherein the spectroscopic analysis system comprises a reflector and/or a beam splitter configured to be inserted into a path of a beam emitted by the light source, the reflector directing at least part of the beam when inserted into the path such that the at least part of the beam passes through the wavelength/frequency calibrator and on to a detector for characterizing intensity changes resulting from interaction of the at least part of the beam with the wavelength/frequency calibrator, and wherein when the reflector is not inserted, the at least part of the beam is directed through the sample fluid and on to the detector or another detector for characterizing intensity changes resulting from interaction of the first portion with the sample fluid, which are recorded in the field spectrum.

11. A method as in claim 9, wherein the wavelength/frequency calibrator is moveable such that the wavelength/frequency calibrator can be positioned along at least part of a beam of light emitted by the light source such that the at least part of the beam passes through the wavelength/frequency calibrator and on to a detector for characterizing intensity changes resulting from interaction of the at least part of the beam with the wavelength/frequency calibrator, and such that the wavelength/frequency calibrator can be positioned away from the at least part of the beam such that the at least part of the beam is directed through the sample fluid and on to the detector for characterizing intensity changes resulting from interaction of the first portion with the sample fluid, which are recorded in the field spectrum.

12. A method as in claim 1, wherein the at least one mathematical operation comprises one or more of adding, subtracting, multiplying, dividing, and integrating.

13. A method as in claim 1, wherein the conversion function comprises at least one additional different mathematical operation applied to a first part of the spectral data set but not to a second part of the spectral data set and/or at least one of a vector and a matrix comprising values that mathematically operate on the spectral data set.

14. A method as in claim 1, further comprising:
determining an adjustment to at least one operating parameter of the spectroscopic analysis system necessary to reduce the characterized frequency registration deviation of the spectroscopic analysis system;
applying the determined adjustment to the spectroscopic analysis system; and
recalculating one or more of the pressure of another field sample, the temperature of the other field sample, and the concentration for one or more analytes in the other field sample using a subsequent field spectrum recorded by the spectroscopic analysis system with the determined adjustment applied.

15. A method as in claim 14, wherein the adjustment to the at least one operating parameter comprises a first adjustment of at least one operating parameter applied to a first part of a scan range of the light source and at least one second adjustment of at least one operating parameter applied to at least one second part of the scan range.

16. A method as in claim 14, wherein the at least one operating parameter comprises one or more of a center operating value of a current provided to the light source, a temperature provided to the light source, a scan amplitude applied to the light source, a scan frequency applied to the light source, a scan profile applied to the light source, a modulation profile applied to the light source, a modulation amplitude applied to the light source, a modulation phase delay applied to the light source, a nominal current value applied to the light source, a current ramp rate applied to the light source, a laser modulation current applied to the light source, a modulation frequency applied to the light source, a phase shift applied to at least one section of the light source, an effective index of refraction change applied to at least one section of the light source, a detection circuit gain setting, a grating angle or position, a filter rotation angle, a temperature of a thermal-optical filter, lock-in amplifier detection phase, and a detection gain.

17. A method as in claim 1, wherein the conversion function comprises a conversion of the field spectrum to a frequency axis that is linear across all or part of the scan range of the light source.

18. A non-transitory computer readable medium storing instructions that, when executed by one or more programmable processors, cause the one or more programmable processors to perform operations comprising:
characterizing a current frequency registration deviation of a tunable diode laser absorption spectroscopic analysis system, wherein the system comprises:
a frequency-scannable laser light source configured to emit light over a desired range of frequencies;
a measurement volume containing a sample fluid and arranged such that light from the light source selectively passes through the measurement volume;
a detector configured to receive the light from the light source and to quantify the received light; and
a wavelength/frequency calibrator arranged such that light from the light source selectively passes therethrough and configured to generate individually resolvable frequency markers, which define a frequency scale within the range of frequencies when the light from the light source passes therethrough,
wherein the characterizing comprises recording a field calibration spectrum, which is generated by passing the light from the light source through the wavelength/frequency calibrator to the detector, wherein the field calibration spectrum is indicative of one or more changes of the light source relative to a stored calibrated state of the spectroscopic analysis system;
deriving a conversion function comprising at least one mathematical operation that reduces the current frequency registration deviation relative to the stored calibrated, wherein the conversion function comprises a fitted mathematical expression to model a relative frequency difference between spectral features present in the field calibration spectrum and the frequency markers provided by the wavelength/frequency calibrator such that the characterized current frequency registration deviation is consistent with a stored calibrated frequency registration deviation of the spectroscopic analysis system characterized when the spectroscopic analysis system was in its calibration state,
wherein the spectral features present in the field calibration spectrum include peaks and/or valleys of one or more of an intensity change, a frequency modulation amplitude, a frequency modulation profile and a frequency modulation phase delay resulting from interaction of the emitted light from the light source with the wavelength/frequency calibrator, as provided by the field calibration spectrum, relative to one or more of an intensity change, frequency modulation amplitude, a frequency modulation profile and a frequency modulation phase delay, respectively, resulting from interaction of light from the light source with the wavelength/frequency calibrator in the stored calibrated state;
converting a field spectrum recorded with the spectroscopic analysis system for a field sample comprising the sample fluid, the field spectrum generated by passing the light from the light source through the measurement volume, wherein the converting comprises applying the conversion function to the field spectrum to produce converted field spectral data comprising spectral data registered to a corrected frequency response of the spectroscopic analysis system, wherein the field spectrum is converted to the frequency scale provided by the wavelength/frequency calibrator such that spectral features of the field spectrum are correctly registered to a same frequency as in the stored calibrated state; and
calculating one or more of a pressure of the field sample, a temperature of the field sample, and a concentration for one or more analytes in the field sample using the converted field spectral data.

19. A spectroscopic analysis system comprising computer circuitry configured to perform operations comprising:
characterizing a current frequency registration deviation of the spectroscopic analysis system, the characterizing comprising recording a field calibration spectrum, which is generated by passing a light from a light source through a wavelength/frequency calibrator to the detector, wherein the field calibration spectrum is indicative of one or more changes of the light source relative to a stored calibrated state of the spectroscopic analysis system;

deriving a conversion function comprising at least one mathematical operation that reduces the current frequency registration deviation relative to the stored calibrated state, wherein the conversion function comprises a fitted mathematical expression to model a relative frequency difference between spectral features present in the field calibration spectrum and frequency markers provided by the wavelength/frequency calibrator such that the characterized current frequency registration deviation is consistent with a stored calibrated frequency registration deviation of the spectroscopic analysis system characterized when the spectroscopic analysis system was in the stored calibrated state, wherein the spectral features present in the field calibration spectrum include peaks and/or valleys of one or more of an intensity change, a frequency modulation amplitude, a frequency modulation profile and a frequency modulation phase delay resulting from interaction of the emitted light from the light source with the wavelength/frequency calibrator, as provided by the field calibration spectrum, relative to one or more of an intensity change, frequency modulation amplitude, a frequency modulation profile and a frequency modulation phase delay, respectively, resulting from interaction of light from the light source with the wavelength/frequency calibrator in the stored calibrated state;

converting a field spectrum recorded with the spectroscopic analysis system for a field sample, the field spectrum generated by passing the light from the light source through the field sample, wherein the converting comprises applying the conversion function to the field spectrum to produce converted field spectral data comprising spectral data registered to a corrected frequency response of the spectroscopic analysis system, wherein the field spectrum is converted to the frequency scale provided by the wavelength/frequency calibrator such that spectral features of the field spectrum are correctly registered to a same frequency as in the stored calibrated state; and calculating one or more of a pressure of the field sample, a temperature of the field sample, and a concentration for one or more analytes in the field sample using the converted field spectral data.

20. A spectroscopic analysis system as in claim 19, further comprising one or more of a sample cell defining a measurement volume, which contains the field sample; optical components for reflecting, splitting, or otherwise directing light from the light source and the measurement volume; temperature control components; and computer or other electronic circuitry for controlling the components and/or collecting and analyzing data.

* * * * *